(12) United States Patent
Hattori et al.

(10) Patent No.: US 7,089,038 B2
(45) Date of Patent: Aug. 8, 2006

(54) DATA COMMUNICATION SYSTEM

(75) Inventors: Osamu Hattori, Chiba (JP); Norihiro Okamoto, Chiba (JP)

(73) Assignee: Seiko Instruments Inc. (JP)

(*) Notice: Subject to any disclaimer, the term of this patent is extended or adjusted under 35 U.S.C. 154(b) by 486 days.

(21) Appl. No.: 10/367,134

(22) Filed: Feb. 14, 2003

(65) Prior Publication Data
US 2003/0228885 A1    Dec. 11, 2003

(30) Foreign Application Priority Data
Feb. 18, 2002    (JP)    ............................. 2002-039581

(51) Int. Cl.
  *H04M 1/00*    (2006.01)
  *H04B 7/00*    (2006.01)
  *H04B 17/00*    (2006.01)
  *H04Q 7/20*    (2006.01)

(52) U.S. Cl. .................. 455/562.1; 455/522; 455/574; 455/115.1; 455/556.1; 455/557

(58) Field of Classification Search ................ 455/522, 455/574, 115.1, 127.1, 232.1, 11.1, 562.1, 455/556.1, 557; 454/556.1, 557
See application file for complete search history.

(56) References Cited

U.S. PATENT DOCUMENTS

| | | | | |
|---|---|---|---|---|
| 5,873,048 A * | 2/1999 | Yun | ............................ | 455/446 |
| 5,924,013 A * | 7/1999 | Guido et al. | ................... | 725/67 |
| 6,381,462 B1 * | 4/2002 | Charas | ..................... | 455/452.2 |
| 6,518,920 B1 * | 2/2003 | Proctor et al. | ............... | 342/367 |
| 6,731,904 B1 * | 5/2004 | Judd | .......................... | 455/11.1 |
| 2001/0023189 A1 * | 9/2001 | Kajimura | ..................... | 455/522 |
| 2003/0017846 A1 * | 1/2003 | Estevez et al. | ............. | 455/556 |
| 2003/0064692 A1 * | 4/2003 | Shi | .......................... | 455/232.1 |
| 2003/0117587 A1 * | 6/2003 | Olson et al. | ................... | 353/30 |

FOREIGN PATENT DOCUMENTS

| | | |
|---|---|---|
| EP | 0265178 | 4/1988 |
| EP | 0917304 | 5/1999 |
| EP | 1050977 | 11/2000 |
| JP | 06156537 | 6/1994 |
| JP | 01332987 | 11/2001 |
| WO | 94011832 | 5/1994 |

* cited by examiner

*Primary Examiner*—George Eng
*Assistant Examiner*—Un C. Cho
(74) *Attorney, Agent, or Firm*—Adams & Wilks

(57) ABSTRACT

A data communication system has a first communication equipment having a first transmitter, a first receiver, and a first controller. A second communication equipment has a second transmitter, a second receiver, and a second controller. The first transmitter transmits a first signal to the second receiver. The first receiver receives a second signal transmitted from the second transmitter. The second signal indicates whether or not the second receiver received the first signal or indicates a condition in which the second receiver received the first signal. The first controller controls the first transmitter to reduce its transmitting power either until when the second signal indicates that the condition of the reception of the first signal received by the second communication equipment is poor or until when the first receiver does not receive any signal from the second transmitter. The second controller generates the second signal in accordance with the first signal.

14 Claims, 21 Drawing Sheets

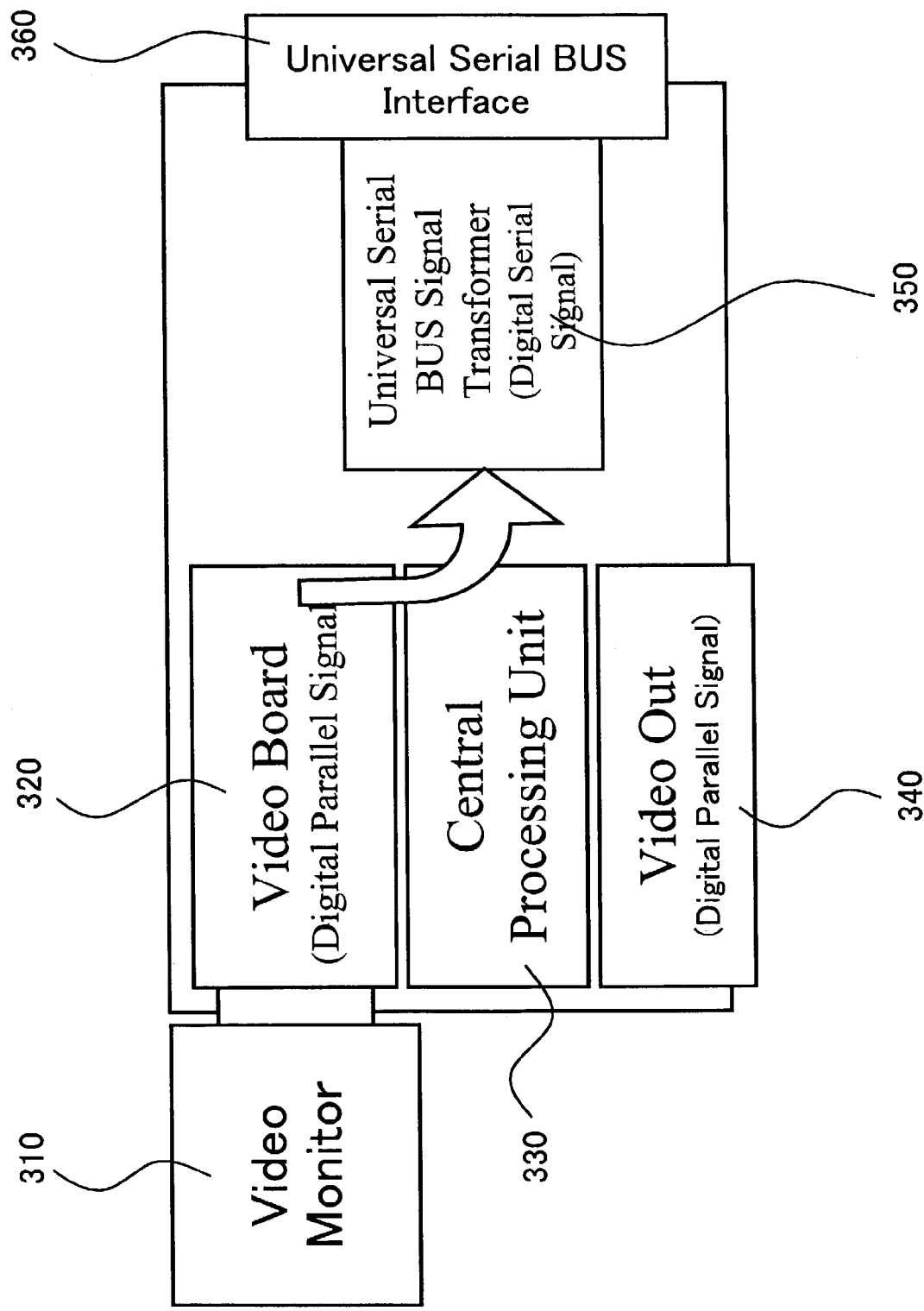

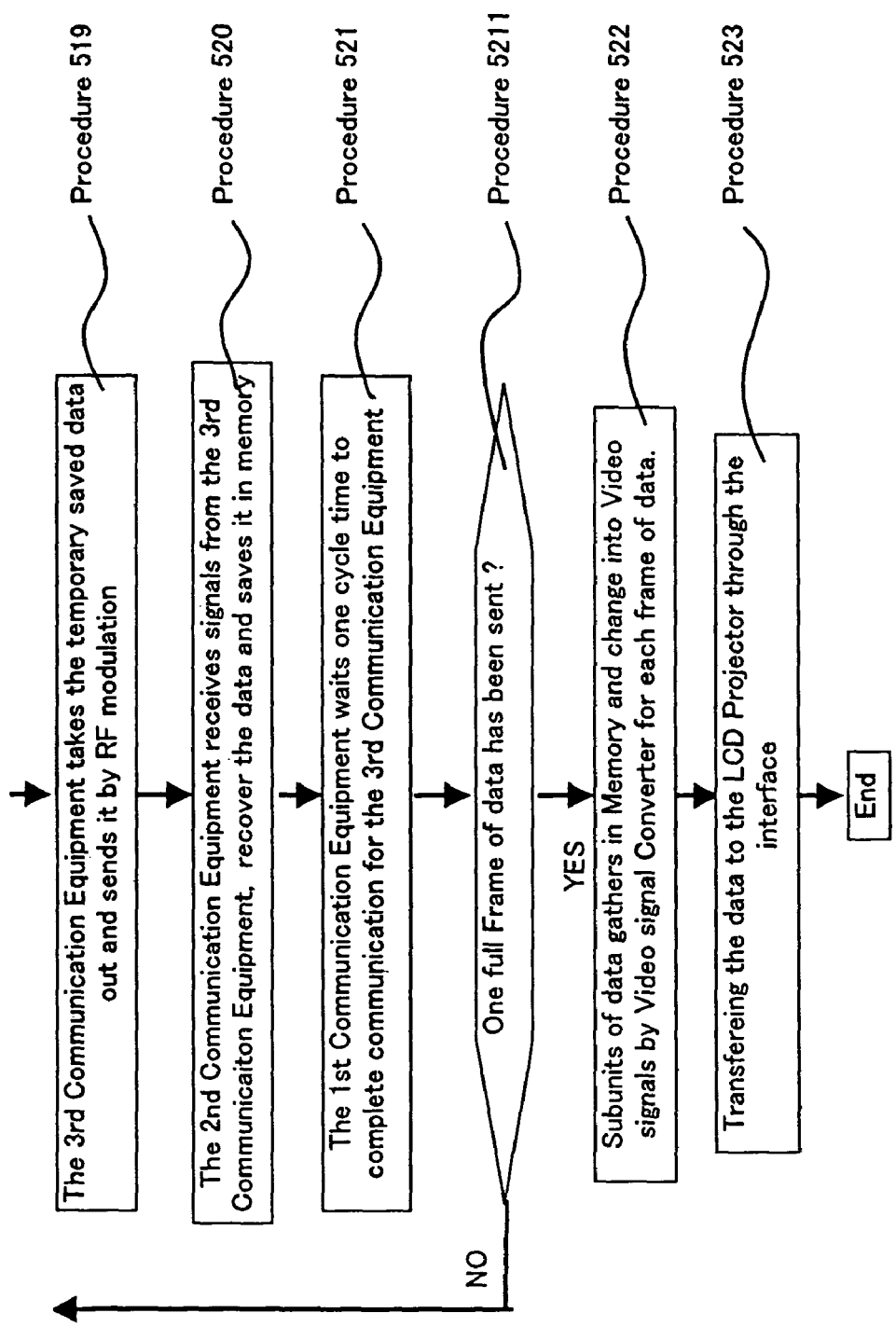

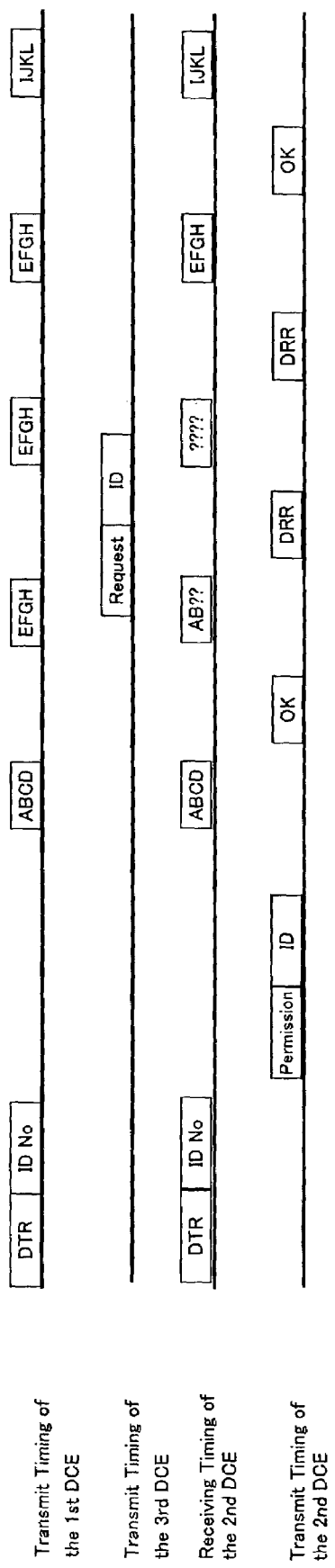

DATA COMMUNICATION SYSTEM

BACKGROUND OF THE INVENTION

1. Field of the Invention

The present invention relates generally to a data communication system and, more specifically, to a the radio communication system for exchanging data, such as movie pictures, still pictures, and voice composite with the pictures, by modulation of radio frequencies.

2. Description of the Prior Art

When linking two or more data communication equipments, in general, each equipment has a link interface for communication with other equipment, and connecting the link interface of each equipment to opposite ends of a cable results in wire link of the equipments.

On the other hand, a contemporary data communication system between two communication equipments that perform bi-directional communication through radio communication circuit confirms the copy ability of a signal by increasing signal strength of the transmitter when there is no reply to the signal transmitted from the transmitter. (E.g. laid-open disclosure public patent bulletin 2001-17417)

For the case of linking through a cable, for example connection of a personal computer (PC) to a Liquid Crystal Display (LCD) Projector, a cable connecting a PC and an LCD projector has a fixed length so that the position of the LCD projector defines that of the PC. Especially, a LCD projector will be set away from a projection screen, and then, the PC has to be set away from the projection screen when high magnification is employed during display.

For the case of Current Radio Link between a PC and a LCD projector, increasing a signal strength may help readability of the signal while no reply is received for the transmitted signals. Increasing the signal strength may cause inadequate radio power shown a reply is received. Excess signal strength causes the reach of a radio wave in excess of what the reach should be, and the problem of concealing confidential information arises if a person copies the transmitted information by catching the radio wave far and out of the room of transmission. The sophisticated signal treatment of adding scramble signals has to be employed in order to avoid copy of the information.

SUMMARY OF THE INVENTION

The data communication system of this invention has the features that a first transmitter that transmits a conditional signal, a first receiver that receives the receiving information that the other communication equipment could copy the conditional signal or not, and, linking the first transmitter and the first receiver, the first communication equipment that posses the first communication method that the first receiver command the first transmitter to reduce transmitting power until the first receiver copies the information that receiving condition is poor or the first receiver copies no signal, and the second communication equipment that posses the second communication method that the second receiver that copies the conditional signal and the control method to create the receiving information based upon the identification of the receiving quality of the conditional signal.

The data communication system of this invention also has the features that the second communication method of the second communication equipment commands the second receiver to increase its sensitivity after having the situation that either after the second transmitter sends the receiving information of poor receiving condition or the second transmitter failed to send the receiving information.

Next, the data communication system of this invention has features that the first communication equipment has the first directional antenna and the second communication equipment has the second directional antenna and the first control method of the first communication equipment adjusts the direction of the first antenna against the second antenna in order to maximize the copy ability of the first receiver and the second control method of the second communication equipment adjusts the direction of the second antenna against the first antenna in order to maximize the copy ability of the second receiver.

Next, the data communication system of this invention has the features to posses a data compressing method to obtain compressed signals by compressing the data concerned and the second communication equipment has a decompressing method to recover the data concerned from the compressed signals produced by the compressing method and the first transmitter sends the compressed signals compressed by the compressing method and the second receiver copies the compressed signals.

Next, the first transmitter and the first receiver of the first communication equipment and the second transmitter and the second receiver of the second communication equipment use the same frequency.

Next, for the data communication system of this invention, while the second communication equipment and the first communication equipment are in communication, the second communication equipment refuses to accept inputs different from the first communication until when the second communication equipment completes receiving all possible data to draw a full frame of a picture.

Next, the data communication system of this invention has an echo repeater system that receives a conditional signal transmitted from the first transmitter and retransmits the conditional signal to the second communication equipment by using the same frequency that the conditional signal of the first transmitter of the first communication equipment is received and that receives the receiving information from the second transmitter and retransmits the information by using the same frequency that the receiving information of the second transmitter of the second communication equipment, and that the first communication equipment either turns off the function of the echo repeater or ignores the signal sent from the echo repeater when the second communication equipment is able to receive the receiving information sent from the first communication equipment without passing through the echo repeater.

The data described here is the data related to pictures and images for the data communication system of this invention.

This invention is a communication system that compresses the data such as an image of still picture with complex voice data, and sends these data toward the designated direction by modulating by radio frequency, and recovers the data either in 100% reproductive form or partially reproductive form. This communication system also has functions of the correction of data error caused while radio wave propagation and bi-directional communication technique to confirm the transmission and the reception. This invention is effective to improve the technical presentation and the presentation to promote the merchandises by linking computers and display equipments such as a Liquid Crystal Display (LCD) Projector or a television set. Specially, it is effective for the case of visiting customers or of coming from outside of the building to perform a presentation while currently installed networking is unable to use and the data is able to be provided to the display unit through the virtual wire network which means radio link.

BRIEF DESCRIPTION OF THE DRAWINGS

A preferred form of the present invention is illustrated in the accompanying drawings in which:

FIGS. 1A–1B are a block diagrams of the data communication system according to the present, wherein FIG. 1A is a block diagram of the first communication equipment and FIG. 1B is a block diagram of the second communication equipment;

FIG. 2 is a schematic of the interface for data transfer;

FIG. 18 is a timing chart for multiple first communication equipments.

DETAILED DESCRIPTION OF THE PREFERRED EMBODIMENTS

[Mode 1 of Invention]

Figure 1A:
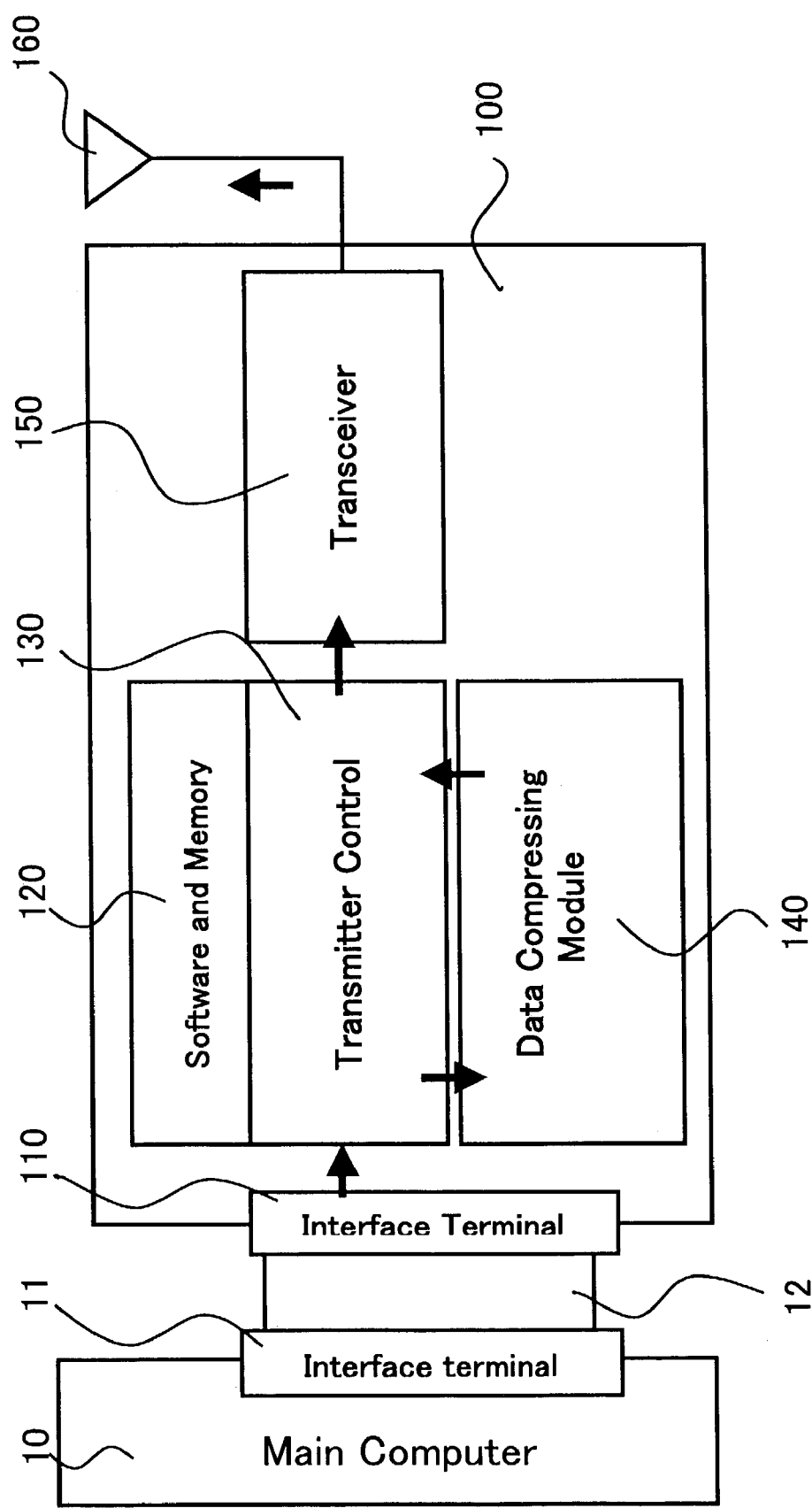
Figure 1B:
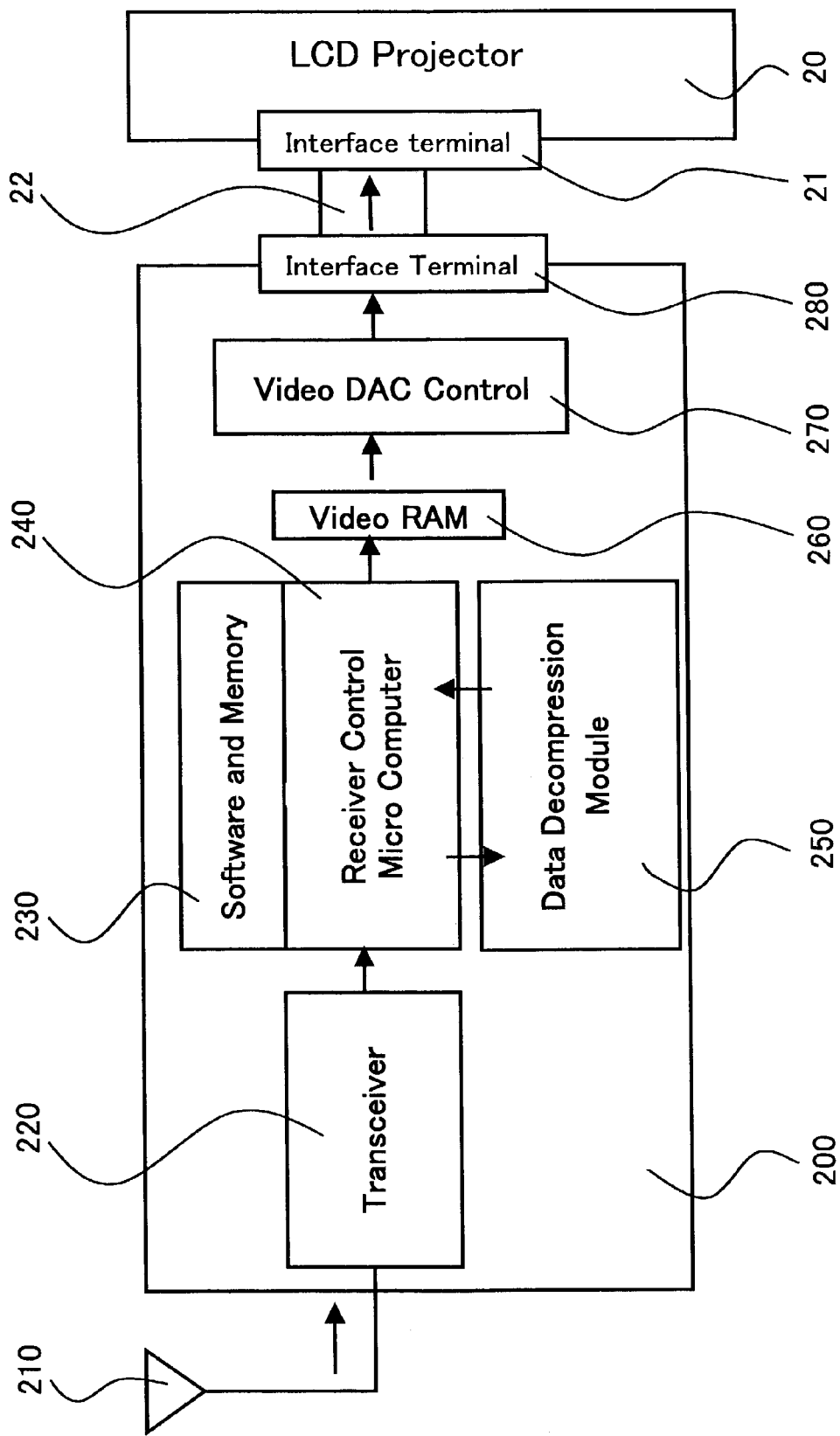

The data communication system of this invention is explained by using the Figures. FIGS. 1A–1B show the block diagram of the communication system of this invention. The mode 1 explains the case to link a computer that has an image to display and a LCD projector that displays the image provided by the computer. The data communication system of the mode 1 has a communication equipment 100 (defined as 'the first communication equipment' hereinafter and also referred as "Transmitter Side') that is physically connected to a computer 10 and sends image data, and a communication equipment 200 (defined as 'the second communication equipment' hereinafter and also referred as "Receiver Side') that is physically connected to a LCD projector and receives the image data from the communication equipment 100.

FIG. 1A shows the block diagram of the first communication equipment 100. The first communication equipment has an interface that links the first communication equipment 100 and the computer 10, a memory unit 120 that memorizes the control software and the data to send, a transmission control unit 130 that compresses the image data outputted from the computer 10 and that controls the transmission of the image data to the transceiver 150, a data compressing module or compression unit 140 that compresses the image data, a transceiver 150 to send and to receive compressed data, and an antenna system 160 to send and to receive radio wave.

The interface comprises an interface terminal 110 of the first communication equipment which is connected to an interface terminal 11 of the computer 100 by via a connector 12. For this case the interface terminal 110 supplies not only the image data but also the power to operate the first communication equipment 100. This signifies that there is no necessity of an external battery or an AC adaptor to supply the power to the first communication equipment 100. The transmission control unit 130 of Transmitter Side compresses the data of images inputted from the interface terminal 110 and sends the data to the second communication equipment 200. Under the condition where the second communication equipment 200 failed to receive the data sent or the data is corrupted, the transmission control unit takes an action to command resending the same data. A microcomputer can be used for the purpose. The data compression unit 140 is a unit to compress the data. The degree of compression rate is selected arbitrary in relation to the total speed of transmission. An integrated circuit of compression can be employed for this purpose. The memory unit 120 memorizes the data compressed at the data compression unit 140. For the case of an image data the data is stored enough to draw one frame of screen. The transceiver 150 transmits the compressed data to the second communication equipment 200 and receives the a signal to identify whether the second communication equipment 200 received the data correctly or not. In these cases the frequency for transmission and reception is the same. The antenna 160 is set to obtain high direction ability to 3 directions. The detail will be described later.

Also, the computer 10 outputs the data to be displayed through the interface terminal 11. The connector 12 connects the first communication equipment 100 and the computer 10. A cable can be used to replace the connector 12.

FIG. 1B shows the block diagram of the second communication equipment 200. The second communication equipment 200 has an antenna 210 that receives the data from the first communication equipment 100, a transceiver 220 that receives the data as well as sends an information whether received data is received correctly or not, a reception control unit 240, a reception memory unit 230, a data decompression module or unit 250 for decompressing the compressed data, a video RAM 260, a video signal conversion unit 270 (e.g., video DAC control) and an interface terminal 280 of the reception side. An LCD projector 20 contains the data output interface terminal 21. The second communication equipment 200 and the LCD projector 20 will be connected by the direction connection of the interface 280 of the reception side and the data output interface terminal 21 or by a connection using a cable.

The antenna 210 set sets the propagation to 3 different directions. The transceiver 220 receives the data transmitted from the first communication equipment 100 and it transmits the information whether received data was correct or not to the first communication equipment 100. The reception control unit 240 examines the status whether the data has been received correctly or not. The reception memory unit 230 memorizes the data decompressed at the data decompression unit 250. The memorizing size is arbitrary. For example a full size of a frame or a half size of the frame. The data decompression unit 250 recovers the data in the form before compression. The interface terminal 280 of the receiver side obtains power from the LCD projector 20. This permits the second communication equipment 200 to avoid provision of an external power supply in order to operate it.

FIG. 2 indicates the data transfer to the interface. Here, FIG. 2 shows the way to transfer the data in the video board of the computer 10 through a Universal Serial BUS (USB) interface 360. A display (e.g. video monitor) 310 of the computer 10 is connected to a video board 320. The image to display is stored as digital signals in parallel form in the video board 320. The digitalized parallel signals are converted in the form of universal serial BUS signals by a central processing unit 330 (e.g., microcomputer). The digitalized parallel signals of the video board 320 are converted into RGB signals as analog parallel signals and are output as the RGB signals.

Figure 3:
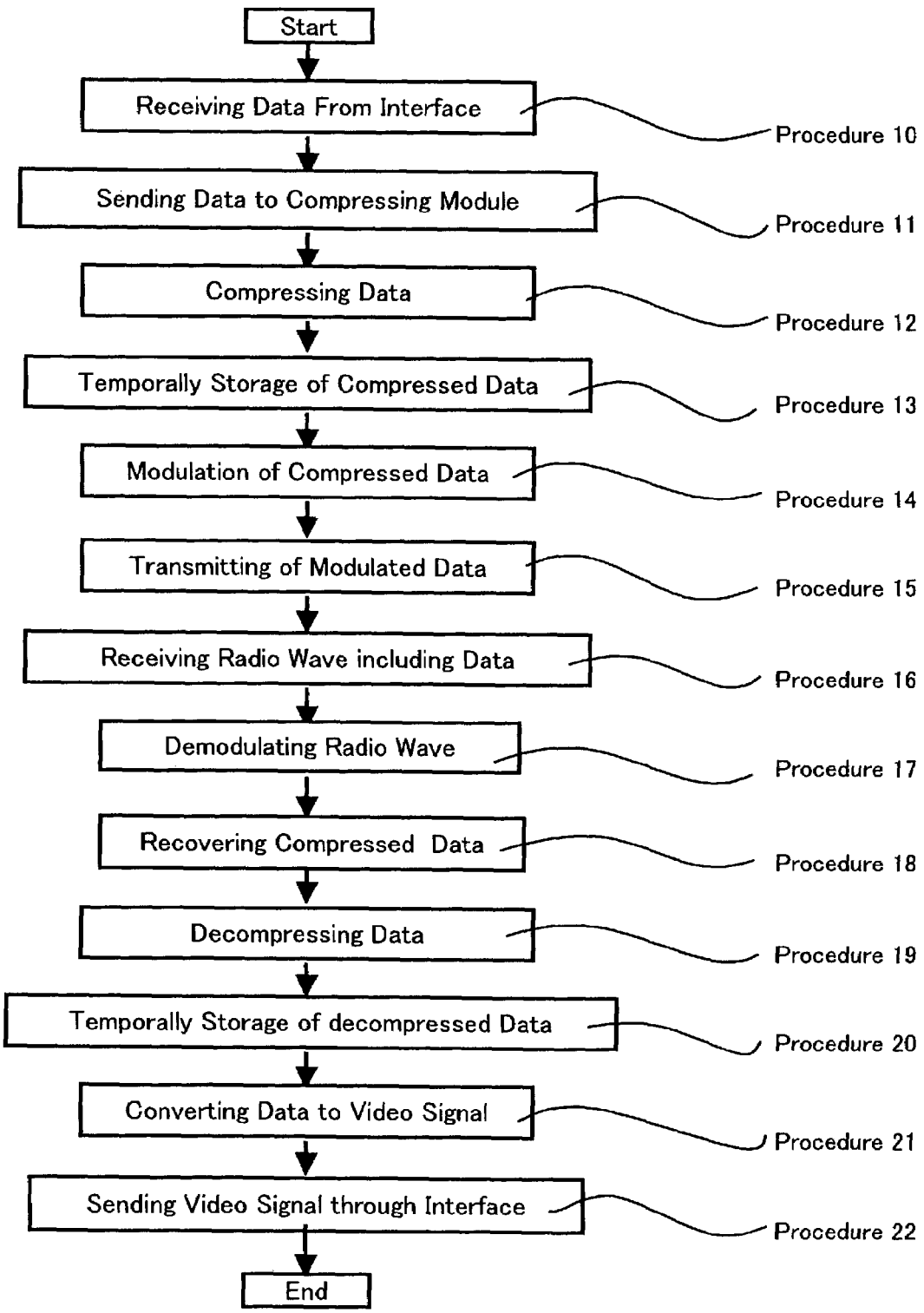
FIG. 3 is a flow chart for the basic data transfer.

The procedures, under the common condition of use, the communication equipment of this invention receiving the data from a computer that has the data for display and the data transfer through radio to the LCD projector, are explained here. FIG. 3 shows the basic flowchart of the transfer procedures. The first communication equipment 100 that is plugged in to the computer 10 converts, by the software installed in the computer, the any data needed to be displayed that is stored in the video memory in the computer such as positioning information of pixels, colors, attributes and synchronizing signals into serial form, and the first communication equipment 100 acquires the data through the interface 11 of the data providing side. (Procedure 10) It is better to use a standard type of interface such as those of USB specification or SCSI specification for both the interface of data supply side and the interface of the transmitter side. For the case of the interface of the USB specification the recognition and clearing the recognition of a new device can be done without shutting down of the computer and many devices can be handled at the time so that it is easy for the communication system to build it in. The acquired signal is sent to the compression unit 140 under the control of the transmission control microcomputer unit 130 of the Transmitter Side. (Procedure 11) In the compression unit 140 the data of one full frame is compressed and stored temporally in the memory unit 120 of the transmitter side. The compression methods described here must be a compression method suitable for a still picture or moving pictures such as those of JPEG specification or MPEG specification. The compressed data is modulated into radio frequency by the transceiver 150 and is propagated into the air through the antenna 160. The radio frequency modulation method may be either Amplitude Shift Keying (ASK) or On-Off Keying (OOK) in order to reduce the occupied bandwidth. The communication equipment 200 connected to the LCD projector 20 receives the radio frequency containing the compressed data through the antenna 210 (Procedure 16), and the transceiver 220 receives the data (Procedure 17), and recovers the compressed data (Procedure 18). The recovered data will be sent to the Data Decompressing Module 250 through the control Computer 240 of Receiver side and the data will be decompressed. (Procedure 19) The decompressed data will be sent to the Video RAM 260 through the control computer 240 of Receiver Side and will be stored temporally. (Procedure 20) The video signal conversion 270 transfers the data stored in the Video RAM 260 into the video signal (Procedure 21) and the video signal will be sent to the interface terminal 280 of the Receiver Side toward the LCD Projector 20. (Procedure 22) this interface terminal 280 is the standard type to the LCD Projector 20 such as that of USB specification or VDI-24 specification.

The antennas 160 and 210 are described here. In order to reduce transmitting power to send data, the antenna should be a directional antenna to gather the power to the specific direction, but to eliminate transmission to the unwanted direction. If the receiving ability of the receiver increases by increasing the electrical electro motive force of the receiving antenna, the transmitting power can be kept low for the transmitter side. For the communication equipments 100 and 200 having the transceivers 150 and 220, the same antenna should be used for both transmitting and receiving.

Increasing in direction ability causes a problem of rapid decreasing in receiving ability if the receiver exists out of the robe of propagation pattern an the propagation pattern should be selected in taking account of the environment of usage for the product of this invention. According to the idea of this invention, it is best to transmit the data to the direction of the receiver using the unidirectional antenna. The size and weight of the antenna is limited if the communication equipment is a part of a mobile computer. For the connection between a Personal Computer 10 and a LCD Projector 20 and for the case that the first Communication Equipment 100 send the data directly to the second Communication Equipment 200, the LCD projector can be placed itself on one of 3 sides, either front, right or left side of the computer operator with respect to horizontal direction ability in general, the communication equipments 100 and 200 can be used without adjusting the antenna direction if these 3 directions are covered. The vertical site of the Personal Computer 10 and the LCD projector 20 is for the most of cases either at the same level or a little bit higher for the site of the LCD Projector 20 than that of the Personal Computer 10. An antenna with lower vertical propagation angle is required for the antennas 160 and 210. A shortest possible antenna in length needs to be required in order to improve its outlook.

The antennas 160 and 210 are the antennas of the multiple elements and fed in the quarter of wavelength each other in space and in electrical phase. For these example two quarter-wavelength vertical antennas are placed in a quarter wavelength in space and are fed 90 degrees in electrical phase are used for the antennas 160 and 210.

Figure 4B:
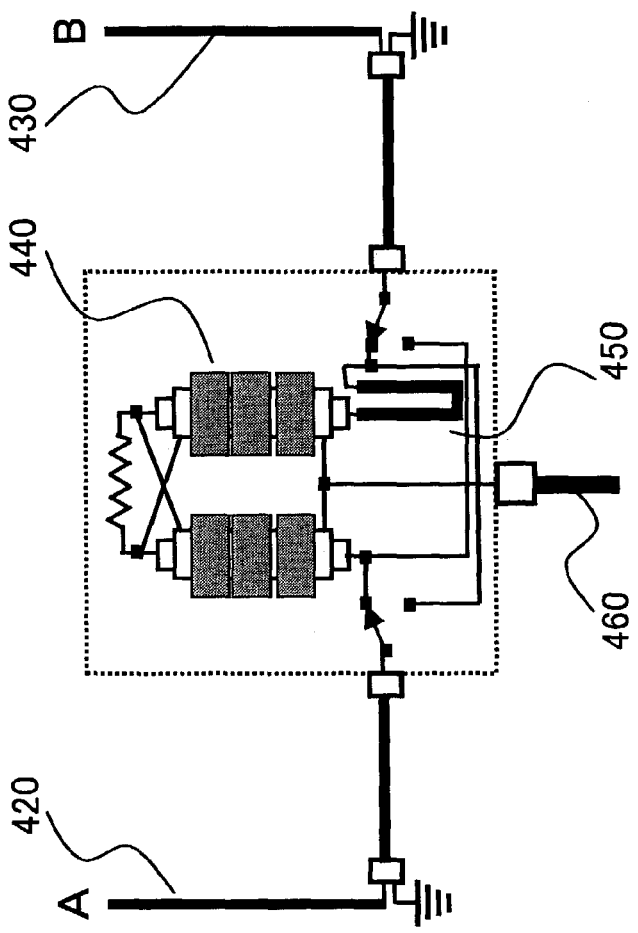
FIGS. 4A–4B show an antenna structure of the data communication system.
Figure 4A:
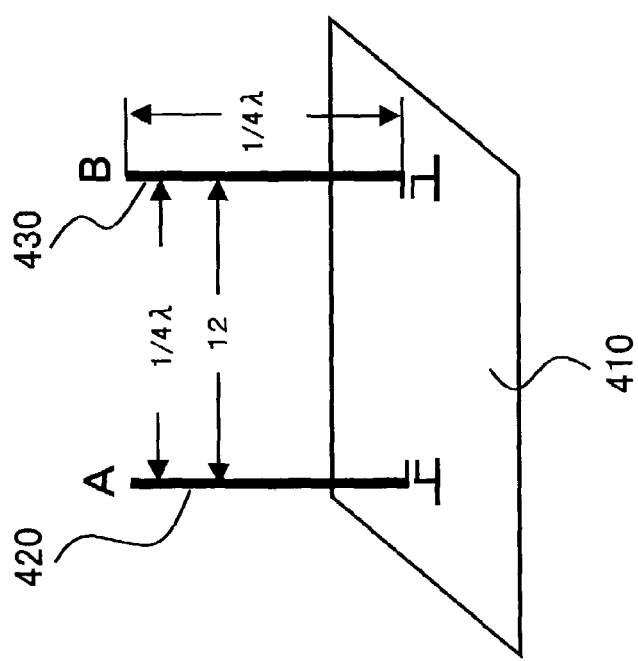

FIGS. 4A–4B show the architecture of the antennas 160 and 210. There is a metal plate of specific dimension 410. There are two quarterwavelength metal rods 420 and 430 stand perpendicular to the metal plate 410 and are placed parallel with a quarter wavelength separation to each other. The radio frequency power supplied by the transceivers 150 and 220 through a co-axial cable 460 will divided into equally two by the Power Divider 440 and, then, one is fed to the Delay Line 450 and, then, to the Metal Rod 420 and the other is fed straight to the Metal Rod 430. The ground lines of both antennas are connected electrically to the Metal Plate 410 and the Metal Plate 410 acts as radio frequency ground. For example the radio carrier frequency is set as 916.5 Mhz and the quarter of wavelength is equivalent to 82 millimeters. The length of both Metal Rods are 82 millimeters in length and those two Metal Rods are placed 82 millimeter separate each other.

Figure 5B:
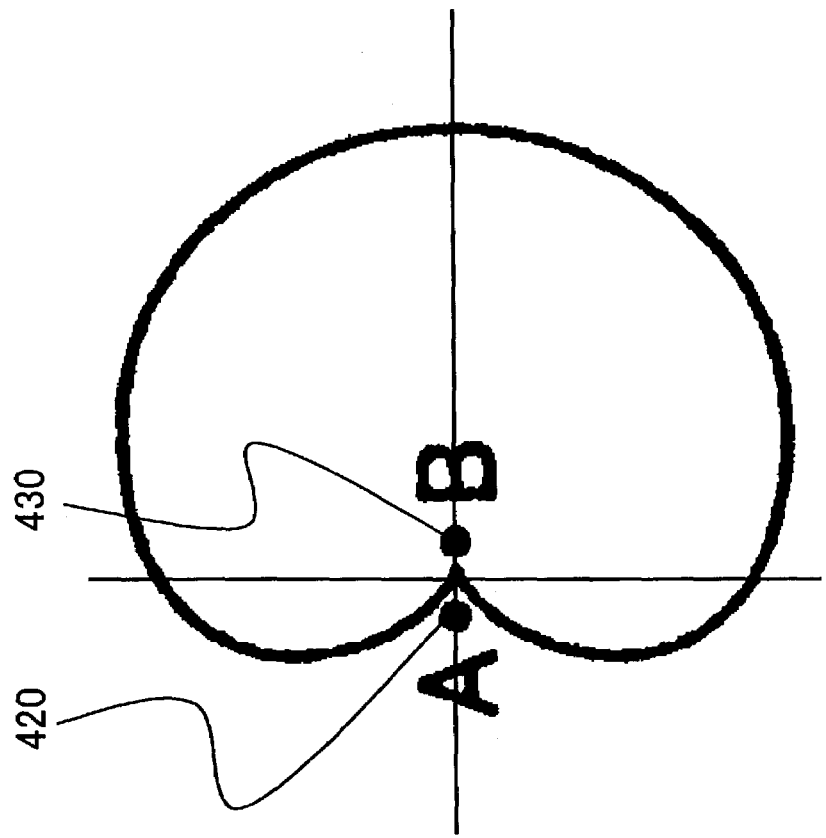
FIGS. 5A–5D show propagation patterns of a radio wave emitted from the antenna of the data communication system.
Figure 5A:
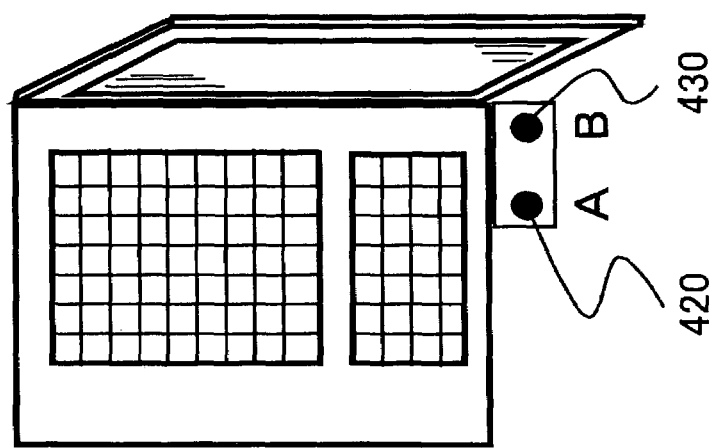
Figure 5D:
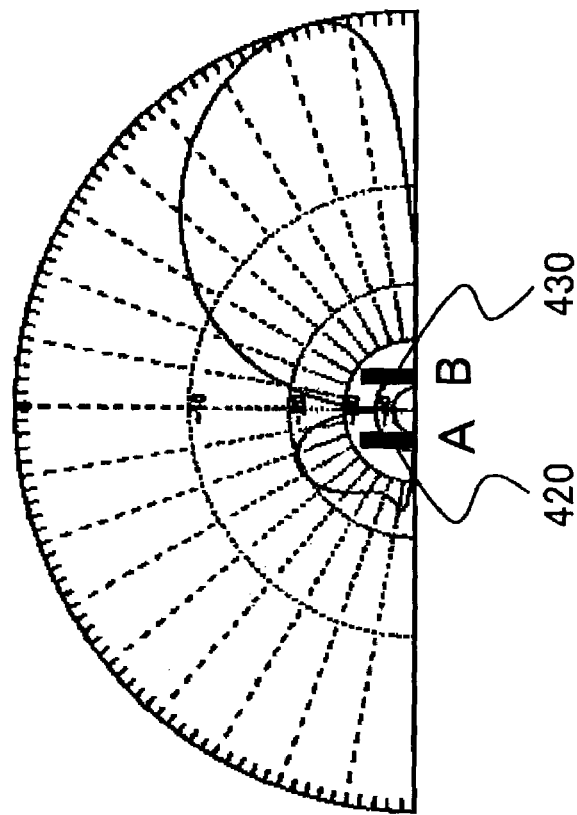
Figure 5C:
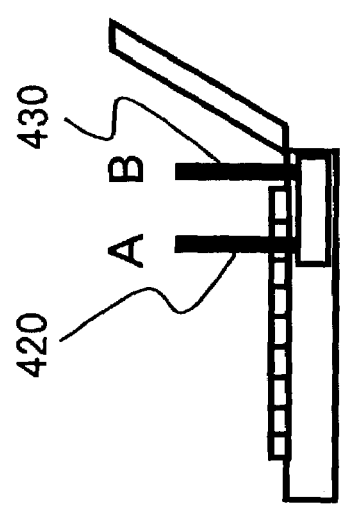

FIGS. 5A–5D show the propagation directions of the antenna. Among the two Metal Rods 410 and 420 we name one as A420 and the other as B430 which is fed–90 degrees of electrical phase in comparison with A420. FIGS. 5A and 5B show the horizontal propagation pattern and show the vertical propagation pattern. When the antennas 420 and 430 act as receiving antennas, the separation in a quarter wavelength in space causes the antennas to function as space diversity antennas.

Figure 6:
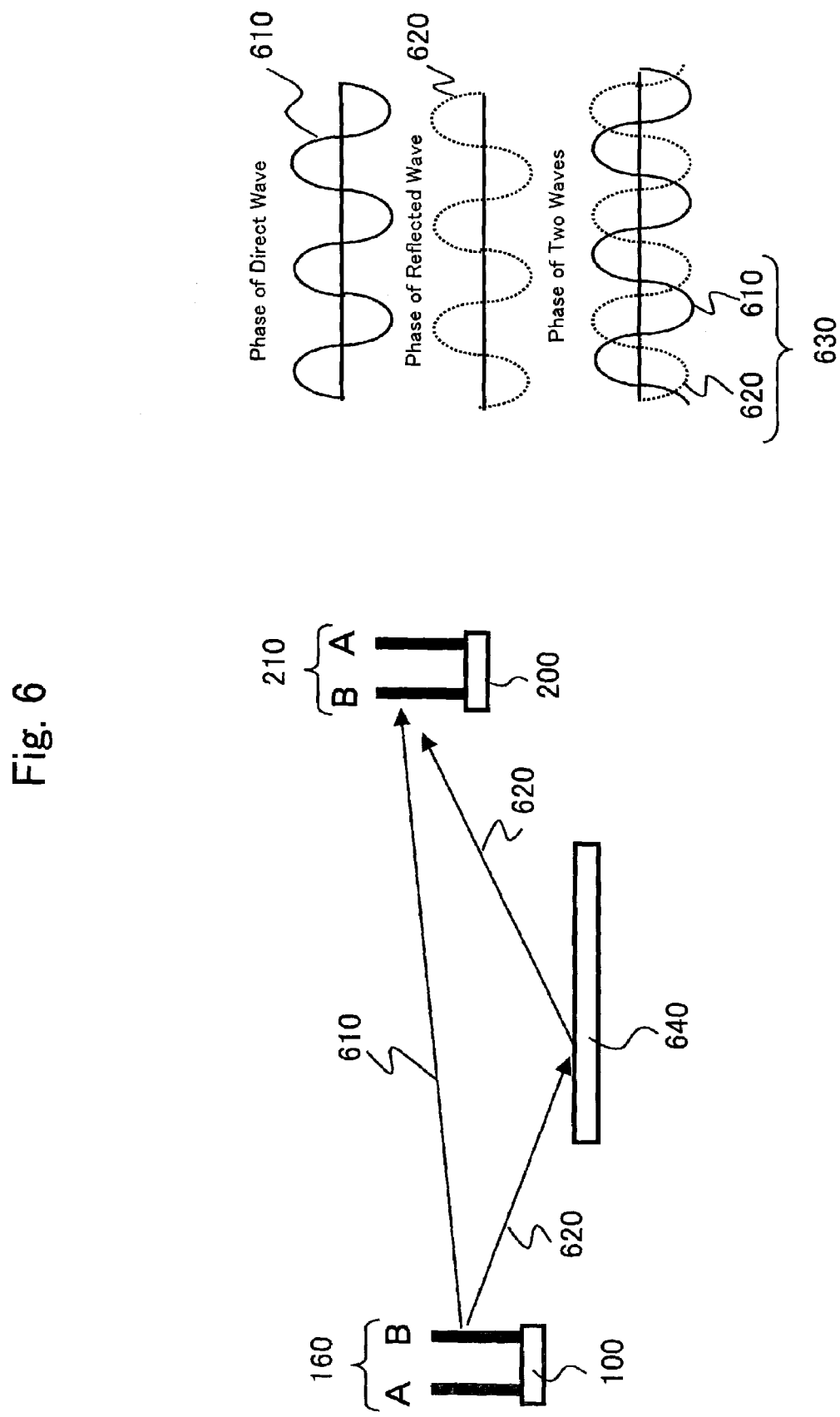
FIG. 6 is an explanation of interference between direct and reflected waves.

FIG. 6 shows the relation in phase of the direct wave and the reflected wave. The radio wave transmitted from the first Communication Equipment 100 will be reflected partially against the Reflecting Surface 640 such as a metal surface or the ground surface and becomes the Reflected Wave 620 with an inverted phase against the direct wave. The Reflected Wave 620 interferes the Direct Wave 610 from the first Communication Equipment 100 and forms a Synthetic Wave 630. This phenomenon lets the variety of radio field strength in distance and the multiple elements of the antennas 160 and 210 placed with space help increasing in electromotive force on the receiving antenna. Increasing in electro motive force on the receiving antenna makes easy on the bad reception caused by the interference of the direct wave and the reflected wave.

Figure 7:
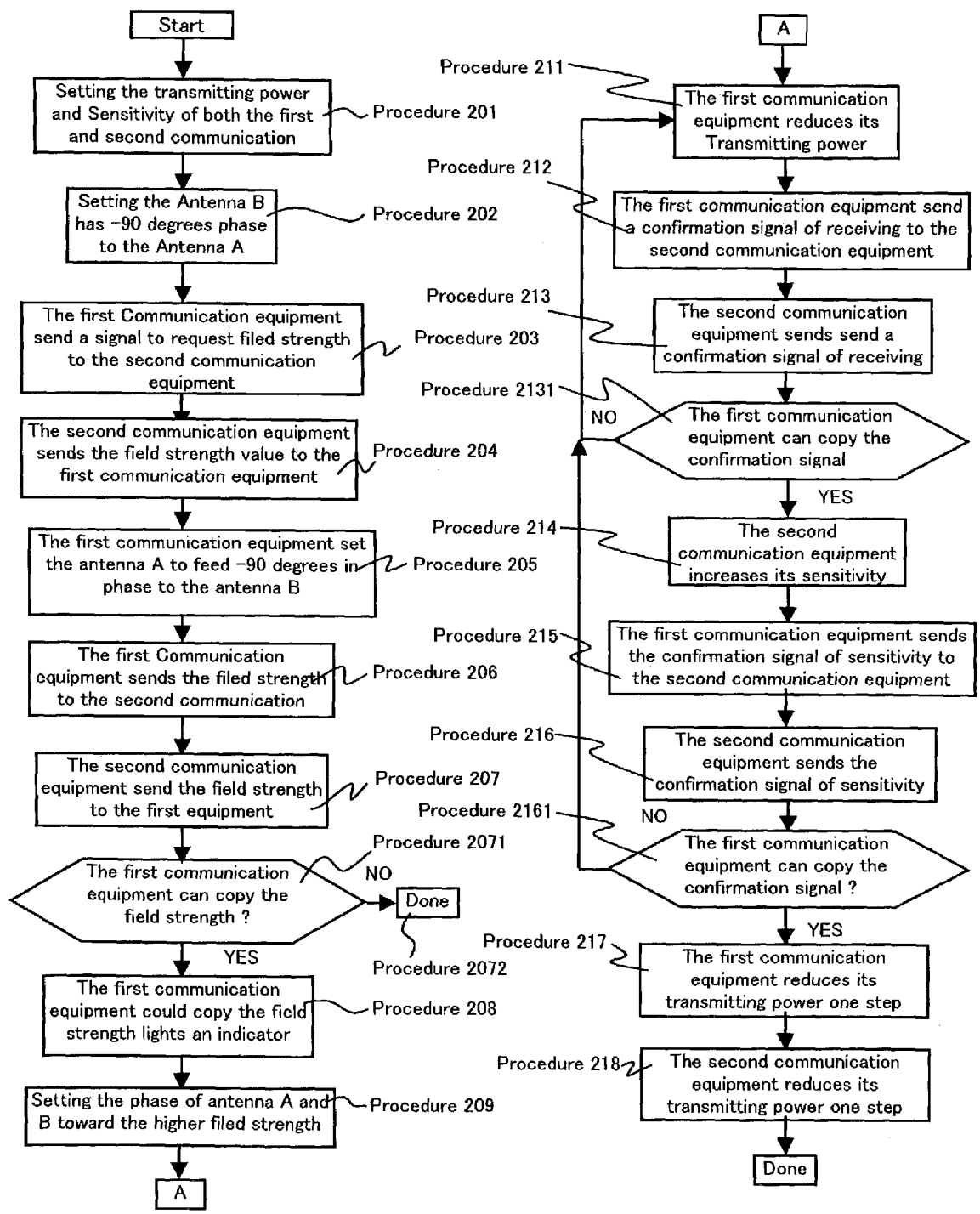
FIG. 7 is a flow chart to detect the adequate transmitting power and the degree of sensitivity.

The method to accommodate the transmitter power and receiving sensitivity is the subject hereinafter. FIG. 7 shows the flow of the method. Firstly, the power and the receiving sensitivity of the first and second Communication Equipments 100 and 200 are set at the middle point of the dynamic range. (Procedure 201) and the antenna B430 for both Communication Equipments are set −90 degrees in phase against the antenna B420 (Procedure 202). The first Communication Equipment 100 sends a signal to request the radio wave field strength toward the second Communication Equipment 200 (Procedure 203). The second communication Equipment 200 sends the signal containing the field strength toward the first Communication Equipment 100 (Procedure 204). The antenna B430 of the first Communication Equipment 100 is set −90 degrees in phase to the antenna A420 (Procedure 205). The first Communication Equipment 100 sends the signal containing the field strength toward the second Communication Equipment 200 (Procedure 206). The first Communication Equipment 100 determines whether the first Communication Equipment 100 can copy the signal from the second Communication Equipment 200 (Procedure 2071). If the first Communication 100 cannot copy the signal from the second Communication Equipment 200, the procedures are terminated as Communication Incomplete. On the other hand, the first Communication Equipment 100 will light the indicator on (Procedure 208). The phase of elements A and B of the antenna is set to the direction of higher field strength (Procedure 209). The first Communication Equipment reduces own transmitting power (Procedure 211). Then, the first Communication Equipment 100 sends the signal of reception recognition signal toward the second Communication Equipment 200 (Procedure 212). The second Communication Equipment 200 sends the signal of reception recognition (Procedure 213). The first Communication Equipment 100 identifies the correct reception of the reception recognition signal (Procedure 2131). When the first Communication Equipment 100 can identify the reception recognition signal, it continues to the Procedure 211 but, if not, the second Communication Equipment 200 increases its sensitivity (Procedure 214). The first Communication Equipment 100 sends the signal of Sensitivity Recognition toward the second Communication Equipment® (Procedure 215). The second Communication Equipment 200 sends the signal of Sensitivity Recognition (Procedure 216). The first Communication Equipment identifies the correct reception of the Sensitivity Recognition signal (Procedure 2161). If the first Communication Equipment 100 can identify the Sensitivity Recognition signal, it continues to the procedure 211 but, if not, the first Communication Equipment 100 increases its own transmitting power and, then, the procedure terminates after the first Communication Equipment 100 put its own transmitting power at one level higher (Procedure 217) and the second Communication Equipment 200 decreases its sensitivity at one level lower (Procedure 218).

For the actual case of usage, if the communication between the LCD Projector 20 and the computer 10 is corrupted or if the settlement of two equipments is modified, the operator of the Computer 10 will perform the procedures above or the first and the second Communication Equipments automatically perform the procedures above within a certain period of time.

Figure 8A:
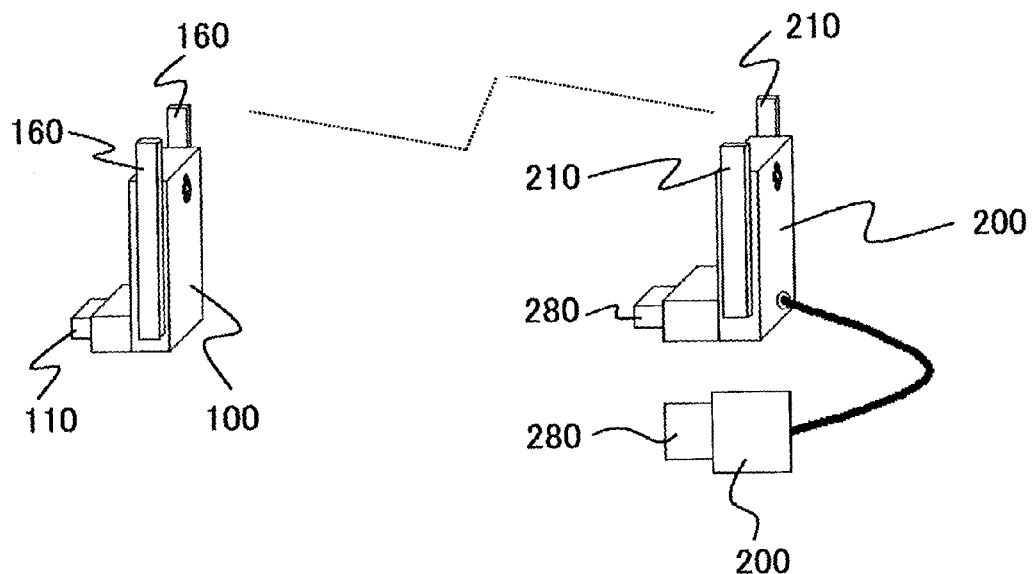
FIGS. 8A–8B are outlook and installation figures of the data communication system.
Figure 8B:
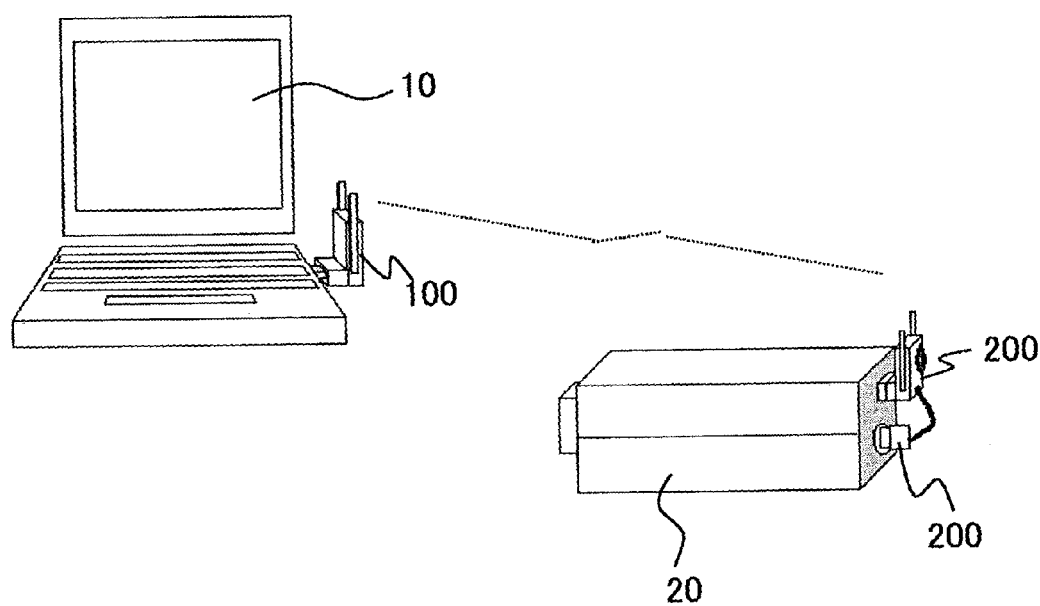

FIGS. 8A and 8B show the side views of the Data Communication Equipments attached to the LDC Projector and the Personal Computer. FIG. 8A shows the attached view of the first Communication Equipment 100 to the computer 10, and FIG. 8B shows the attached view of the second Communication Equipment 200 to the LCD Projector 20. For the Communication Equipments 100 and 200 of this invention, the Interface Connectors 110 and 280 are physically and directly coupled with the enclosure of the communication equipment, and for the first Communication Equipment 100, for example, the USB Connector 11 of the first Communication Equipment 100 will be inserted to that of the Computer 10. For the second Communication Equipment 200, the VDI-48 Connector 21 is directly inserted to that of the LCD Projector 20.

Figure 9:
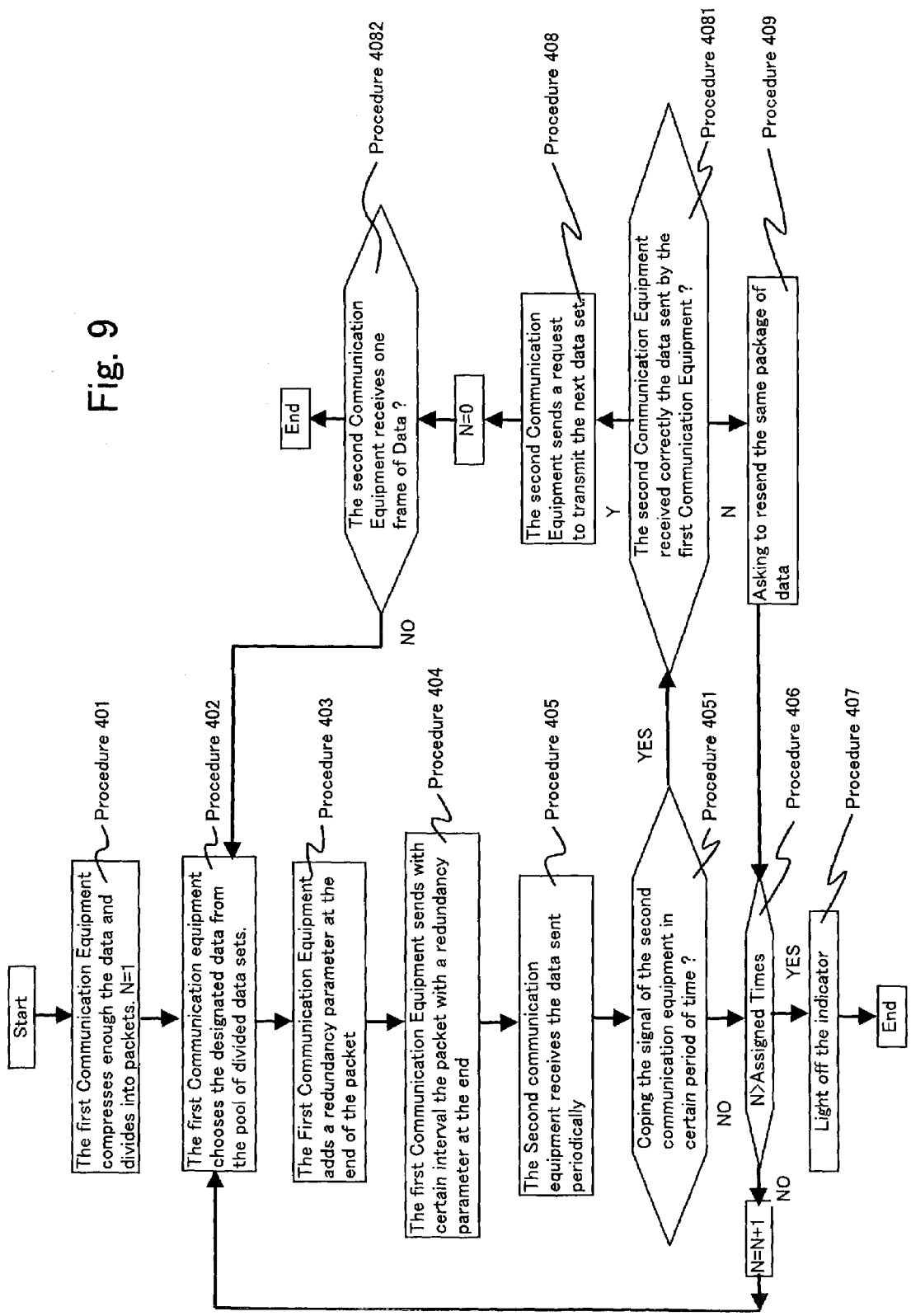
FIG. 9 is a flow chart for correcting the content of data transfer.

When the environment where the Communication Equipment of this invention is in use has a lot of communication interference and high noise level background, the data received has to ensure the quality of reception by performing error checking process in order to display the correct data. The actual process is explained based on FIG. 9. FIG. 9 shows the flow chart of data correction process while data transfer. In this invention, the first Communication Equipment 100 compresses the data to send and divides the compressed data to into subunits (Procedure 401). The first Communication Equipment chooses a specific subunit of the data set (Procedure 402). The first Communication Equipment 100 adds a parameter to evaluate the quality of receiving data such as a Cyclic Redundancy Parameter at the tail of the selected subunit the data set (Procedure 403). The first Communication Equipment 100 repeats, within a given interval, sending the subunit of the data set with the parameter to evaluate the quality of receiving data (Procedure 404). The second Communication Equipment 200 receives the subunit of the data set sent with the given interval (Procedure 405). The evaluation is then made whether the second Communication Equipment 200 could copy the subunit of the data set within the specific period of time (Procedure 4051). If there is no response from the second Communication Equipment, the first Communication Equipment 100 resends the same subunit of the data set (Procedure 406). If the number of resending of the same subunit of the data set exceeds the a certain number and there is still no response from the second Communication Equipment 200, then the first Communication Equipment 100 the reception indicator off and the communication process is terminated (Procedure 407). The second Communication Equipment 200 will verify the content of the received data (Procedure 4081) and the second Communication Equipments 200 sends the signal of next data set request to the first Communication Equipment 100 if the received at a was evaluated to be correct (Procedure 408). The first Communication Equipment 100 terminates data transfer if the first Communication Equipment 100 determines that one frame full of data is sent (Procedure 408). In On the other hand, the first Communication Equipment 100 resends the same subunit of the data set if the response of the second Communication Equipment 200 is 'Not Correct Reception' (Procedure 409).

Figure 10:
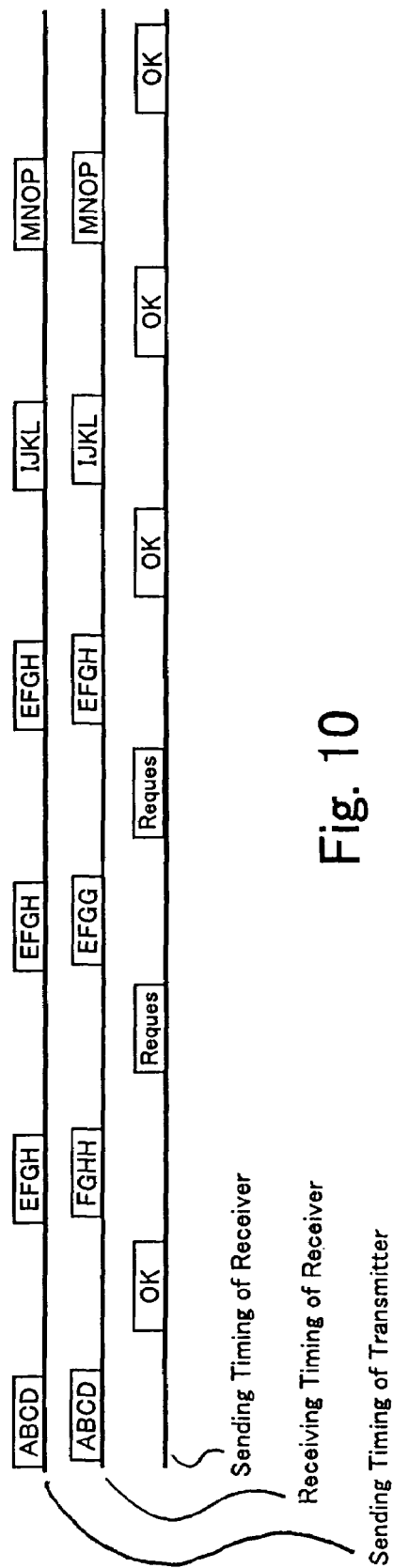
FIG. 10 is a timing chart for correcting the content of data transfer.

FIG. 10 shows the timing chart of Data Correction on the radio communication. While sending a large data by radio communication system, the transmitting period of time is elongated and there is higher possibility for the data to be corrupted by spike noises and unexpected radio interference. The features of the is invention permits, by dividing the data into subunits and by sending the subunit by subunit in order to minimize duration of each transmission, minimizing the change of data corruption and minimizing duration of the resending data. These features also permit to provide efficiency to the LCD Projector 20 that handle a large size of data while data transfer by single wave radio telecommunication. The first Communication Equipment 100 as the transmitter sends the data "ABCD' and then the second Communication Equipment 200 as the receiver copies the data "ABCD.' If the second Communication Equipment 200 could receive the data 'ABCD' correctly, then the second Communication Equipment 200 send the accepting signal such as Okay or Ack. The first Communication Equipment 100 receives the accepting signal an then the first Communication Equipment 100 sends the next data set 'EFGH.' The second Communication Equipment 200 receives the data set 'EFGH.' If the data is not received well, the second Communication Equipment 200 sends the data-resending signal. Then, the first Communication Equipment 100 resends the data 'EFG.' The first Communication Equipment 100 continues to resend the data 'EFGH' until the second Communication Equipment 200 sends the accepting signal. Moreover, for the data 'IJKL' and the data 'MNOP', as the same procedure is followed as for the data 'ABCD'.

[Mode 2 of Invention]

Figure 11:
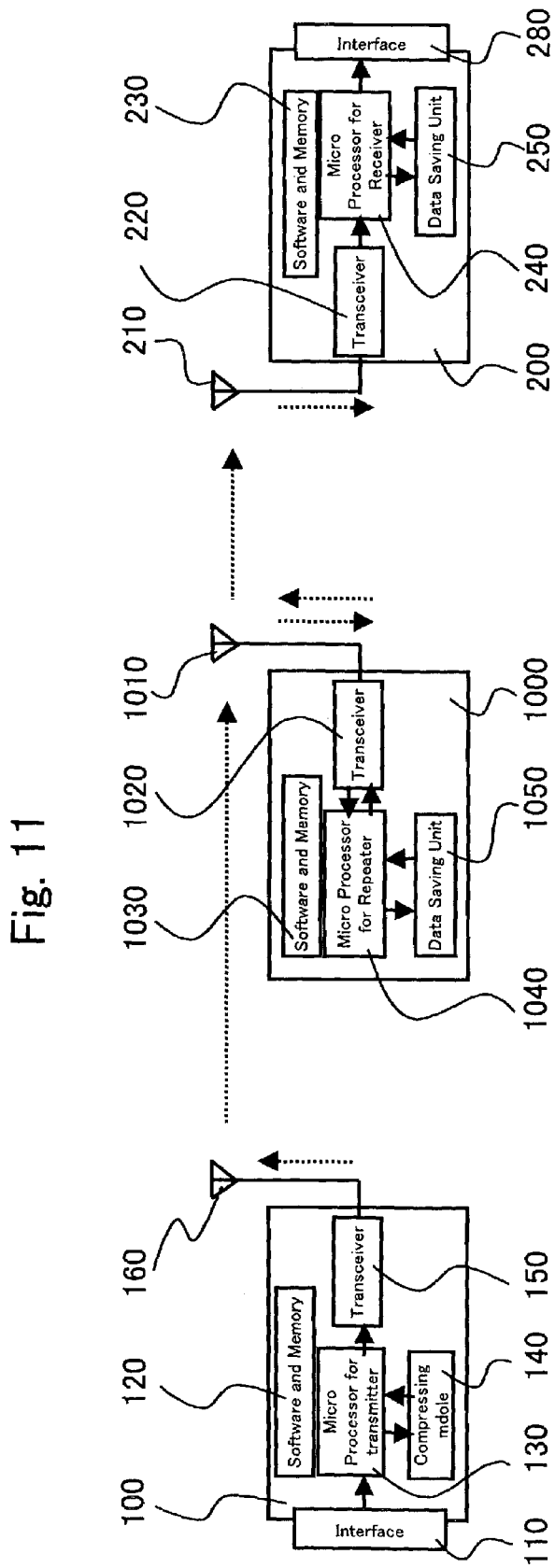
FIG. 11 is a block diagram while using an echo repeater.

During use of the communication equipment of this invention, several meters in communication range is largely enough for the normal use of the equipment. The required range may be more than several ten meters while using the equipment in an auditorium. In other cases, the data can be transferred by passing the a third Communication Equipment 1000 that has echo-repeating capability. FIG. 11 shows the block diagram for the case of communication with a repeater system.

A third Communication Equipment 1000 exists in a space between the first Communication Equipment 100 and the second Communication Equipment 200, and it has a the function of a, repeater that amplifies in power and retransmits the signal containing the data transmitted from the first Communication Equipment 100 toward the second Communication Equipment 200. The third Communication Equipment 1000 has the Antenna 1010, the Transceiver 1020, the Memory Unit of Repeater (Memory Part of Repeater side) 1030, the Controlling Micro Computer (Controlling Part of Repeater) 1040 and the Temporary Data Storage Area 1050.

The Antenna 1010 receives the radio wave from the first Communication Equipment 100 and the second Communication Equipment 200 and retransmits it to the other part.

The Transceiver 1020 handles communication between the first Communication Equipment 100 and the second Communication Equipment 200. The frequency of the communication is the same for all the time.

The Controlling Part of the Repeater 1050 sends a command to store the data sent from the first Communication Equipment 100 to the Temporary Storage Area 1050 and sends a command to retransmit the data stored in the Temporary Storage Area 1050 toward the second Communication Equipment 200.

The Temporary Storage Area 1050 stores the data temporally and the data is valid until all the content within the area until the data is completed to send to the second Communication Equipment 200. It is possible for the data in the Temporary Storage Area 1050 to be valid until receiving the signal indicating the reception is fine.

The Memory Part of Repeater Side 1030 stores the controlling software of the Controlling Part of Repeater 1040. At the same time the Memory Part of Repeater Side can store the part of the data of the Memory Part of Repeater. The first Communication Equipment 100 and the second Communication Equipment 200 are the same as explained above for mode 1 of Invention. The first Communication Equipment 100 does not communicate directly with the second Communication Equipment 200 but always communicates with it via the third Communication Equipment 1000.

Figure 12:
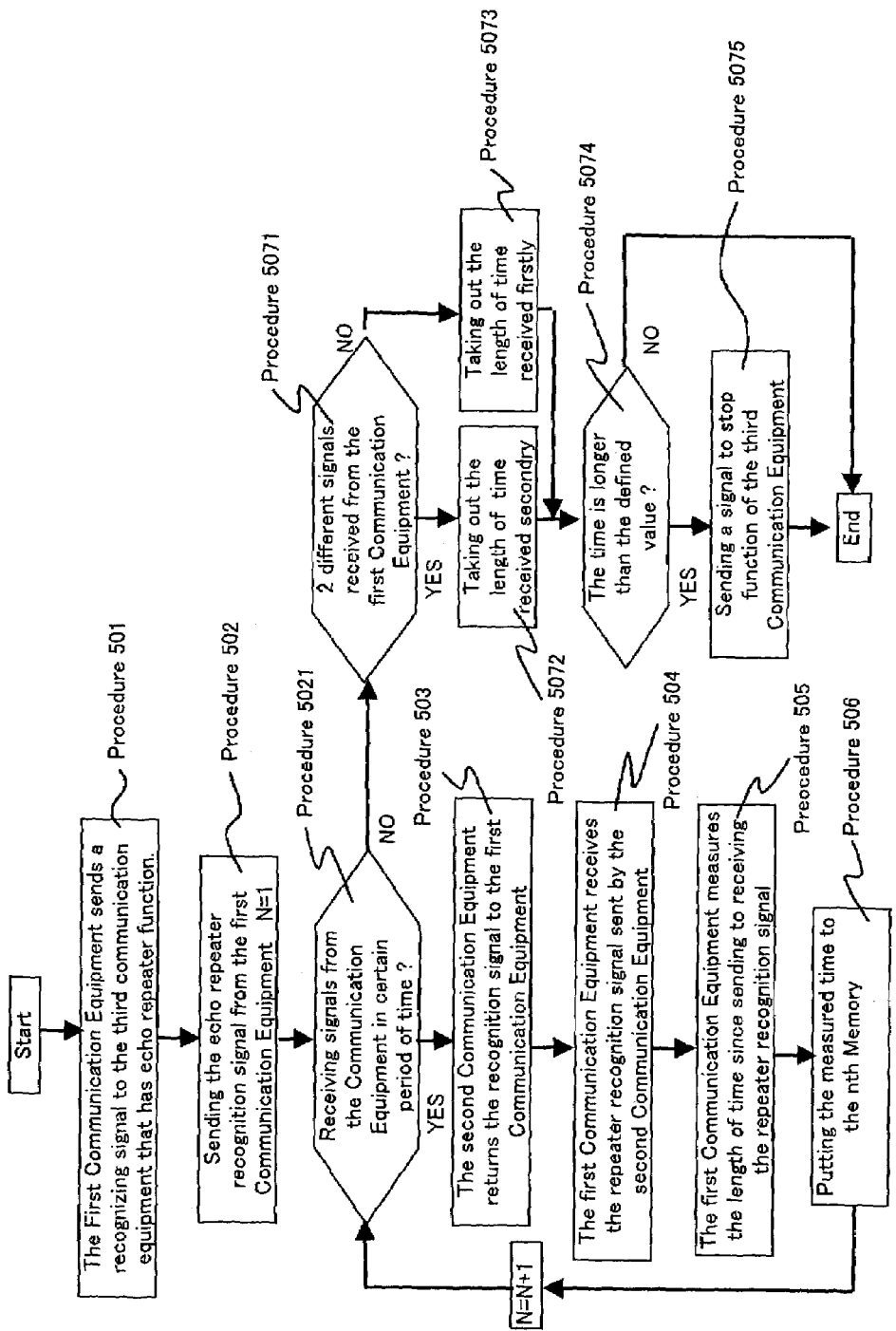
FIG. 12 is a flow chart for recognition procedure of an echo repeater.

While the first Communication Equipment 100 communicates with the same frequency as that of the second Communication Equipment 200, here defines the method to determine whether the second Communication Equipment 200 receives information via the third Communication Equipment 1000 which has the echo repeater function or the second Communication Equipment 200 receives directly from the first Communication Equipment 100. FIG. 12 shows the flowchart to recognize the third Communication Equipment 1000.

Figure 13:
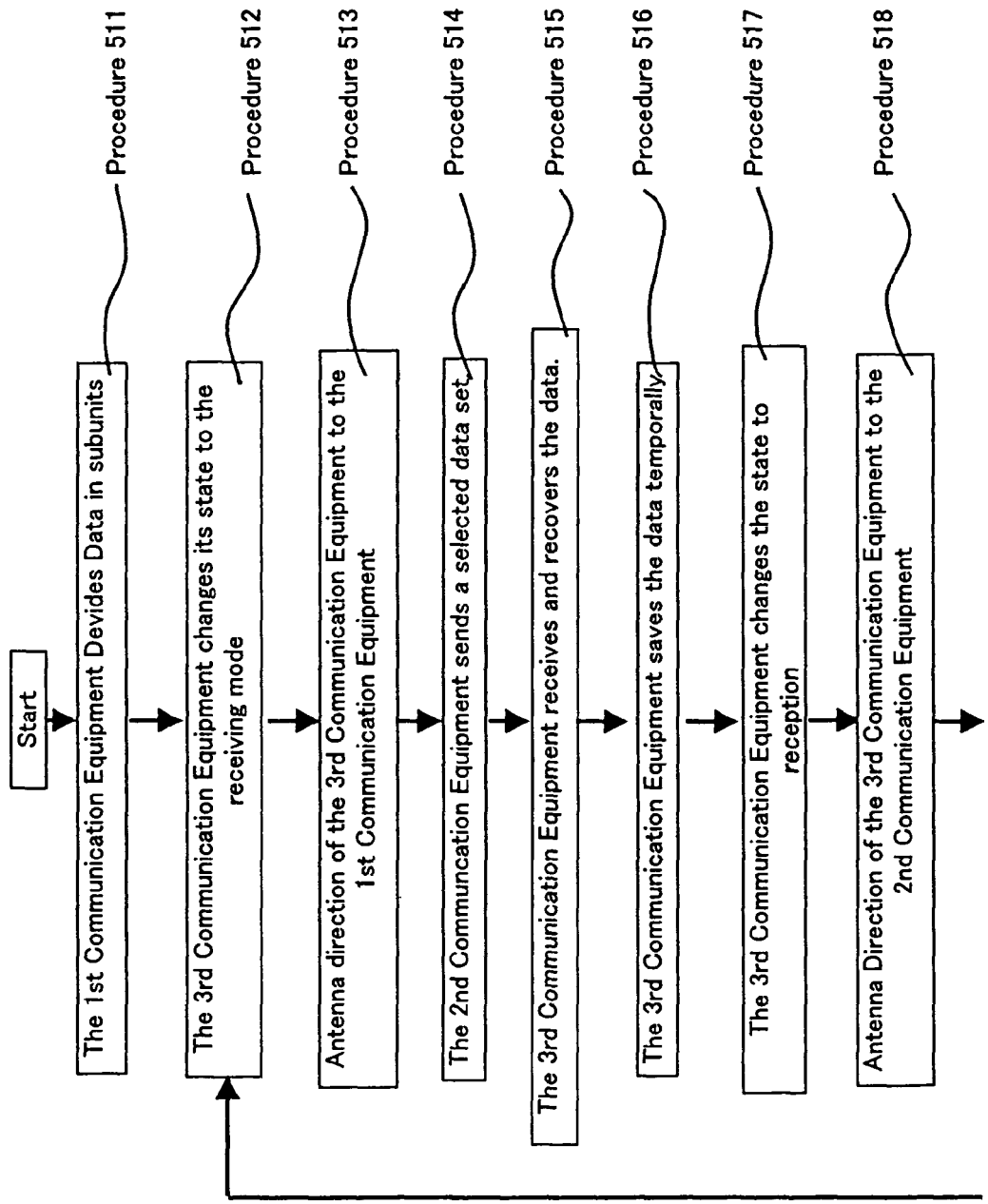
FIG. 13 is a flow chart while using an echo repeater.

The first Communication Equipment 100 sends a signal to the third Communication Equipment that has an a echo repeater function (Procedure 501). The first Communication Equipment 100 sends a signal to recognize the echo repeater (Procedure 502). The first Communication Equipment 100 verifies if the second Communication Equipment 200 could receive the signal from the first Communication Equipment 100 in a given period of time (Procedure 5021). If received correctly, the second Communication Equipment 200 returns the echo repeater recognition signal to the first Communication Equipment 100 (Procedure 503). The first Communication Equipment 100 receives the echo repeater recognition signal sent by the second Communication Equipment 200 (Procedure 504). The first Communication Equipment 100 measure the length of time from the point when the echo repeater recognition signal has been sent to the point when the return signal was received (Procedure 506). The first Communication Equipment 100 stores the measured length of time (Procedure 506). If reception was acknowledged insufficient at the procedure 5021, the first Communication Equipment 100 identifies if the two different signals are copied (Procedure 5071). If the two different signals are copied, the delay of time in which the second signal is received will be measured (Procedure 5072). If the case of only one signal is received, the delay of time for the signal received will be measured (Procedure 5073). The first Communication Equipment 100 acknowledges whether 2 signals exist (Procedure 5073). The measured delay of time is compared with the reference value (Procedure 5074). If the measured delay is longer the reference value the first Communication Equipment 100 send the signal to stop the function of the third Communication Equipment 1000 (procedure 5075). If the measured Delay is shorter than the reference value, the process will be terminated. The method not to evaluate a communication error will be explained with FIG. 13 is a flow chart of how the first Communication Equipment 100, the third communication Equipment 1000 that has function of echo repeater, and the second Communication Equipment 200 are communicated. The advantage of this invention is that the first Communication Equipment 100 can use the second Communication Equipment 200 as the short distance communicator and the Computer is able to send data to the LCD Projector at a distance via one or more third Communication equipments having the function of an echo repeater, and that all of the communication can be achieved using the same frequency. The first Communication Equipment 100 divides the data into subunits (Procedure 511). The third Communication Equipment having a function of an echo repeater gets into a reception state (procedure 512). The third communication Equipment 1000 having a function of an echo repeater identifies and sets the direction of its antenna where the reception of the signal from the first Communication Equipment 100 is as maximum (Procedure 513). The first Communication Equipment 100 sends the designated subunit of the data (Procedure 514). The third Communication Equipment 1000 receives and recovers the data (Procedure 515). The third Communication Equipment 1000 having the function of echo repeater stores the recovered data temporally (Procedure 516). The third Communication Equipment 1000 having the function of an echo repeater identifies and sets the direction of its antenna where the reception of the signal from the second Communication Equipment 200 is maximum (Procedure 517). The third Communication Equipment having the function of an echo repeater gets into a transmission state (Procedure 518). The third Communication Equipment 1000 having the function of an echo repeater takes temporally stored data out and modulated in radio frequency in order to end it (Procedure 519). The radio wave from the third Communication Equipment 1000 having the function of an echo repeater is captured by the second Communication Equipment 200 and recovers the data and stores the data (Procedure 520). After transmission is over the third Communication Equipment 1000 having the function of an echo repeater waits the period of time equivalent to or more than one complete cycle of communication that is the sum of reception, transmission and mode change time (Procedure 52l). The evaluation takes place weather one frame of data has been sent or not (Procedure 5211). Before a full frame of data is sent, the process goes back to the procedure 512. Otherwise, subdivided data is stored in the memory and is converted into video signals by a video signal converter frame by frame (Procedure 522) and is transferred to the LCD Projector 20 through an interface (Procedure 523).

Figure 14:
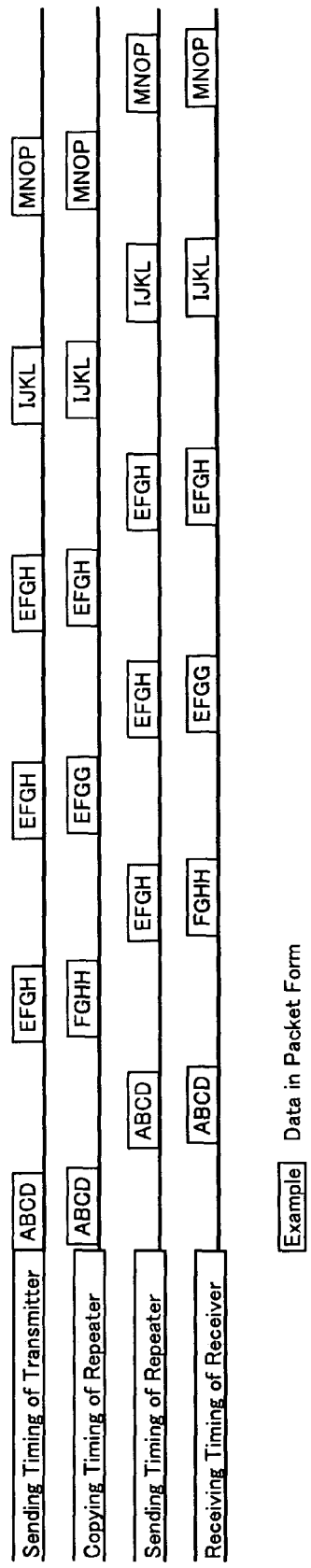
FIG. 14 is a timing chart while using an echo repeater.

FIG. 14 shows the transmission timing chart of the first Communication Equipment 100, the third Communication Equipment 1000 having the function of an echo repeater and the second Communication Equipment 200. The first Communication Equipment 100 as a transmitter sends the data 'ABCD.' The third Communication Equipment 1000 having the function of an echo repeater copies the data 'ABCD.' the third Communication Equipment 1000 having the function of an echo repeater sends the data 'ABCD' to the second Communication Equipment 200 as a receiver. The second Communication Equipment 200 copies the data 'ABCD.' If the second Communication Equipment copied the data correctly, it sends the accepting signal to that effect. The third Communication Equipment 1000 having the function of an echo repeater copies the accepting signal and retransmits the same signal to the first Communication Equipment 100. If the first Communication Equipment 100 finally receives the accepting signal, then the first Communication Equipment 100 sends the next data set 'EFGH.' The data 'EFGH' goes through the same pass via the third Communication Equipment 1000 having the function of an echo repeater as the data 'ABCD.' If the second Communication Equipment 200 does not copy the data well, then it sends the resending request signal to the first Communication Equipment 100 via the third Communication Equipment 1000 having the function of an echo repeater. The first Communication Equipment repeats sending the data 'EFGH' until it receives the accepting signal from the second Communication Equipment 200. The sending of the data 'IJKL' and the data 'MNOP' is done in the same manner as for the data 'ABCD'.

[Mode 3 of Invention]

Figure 15:
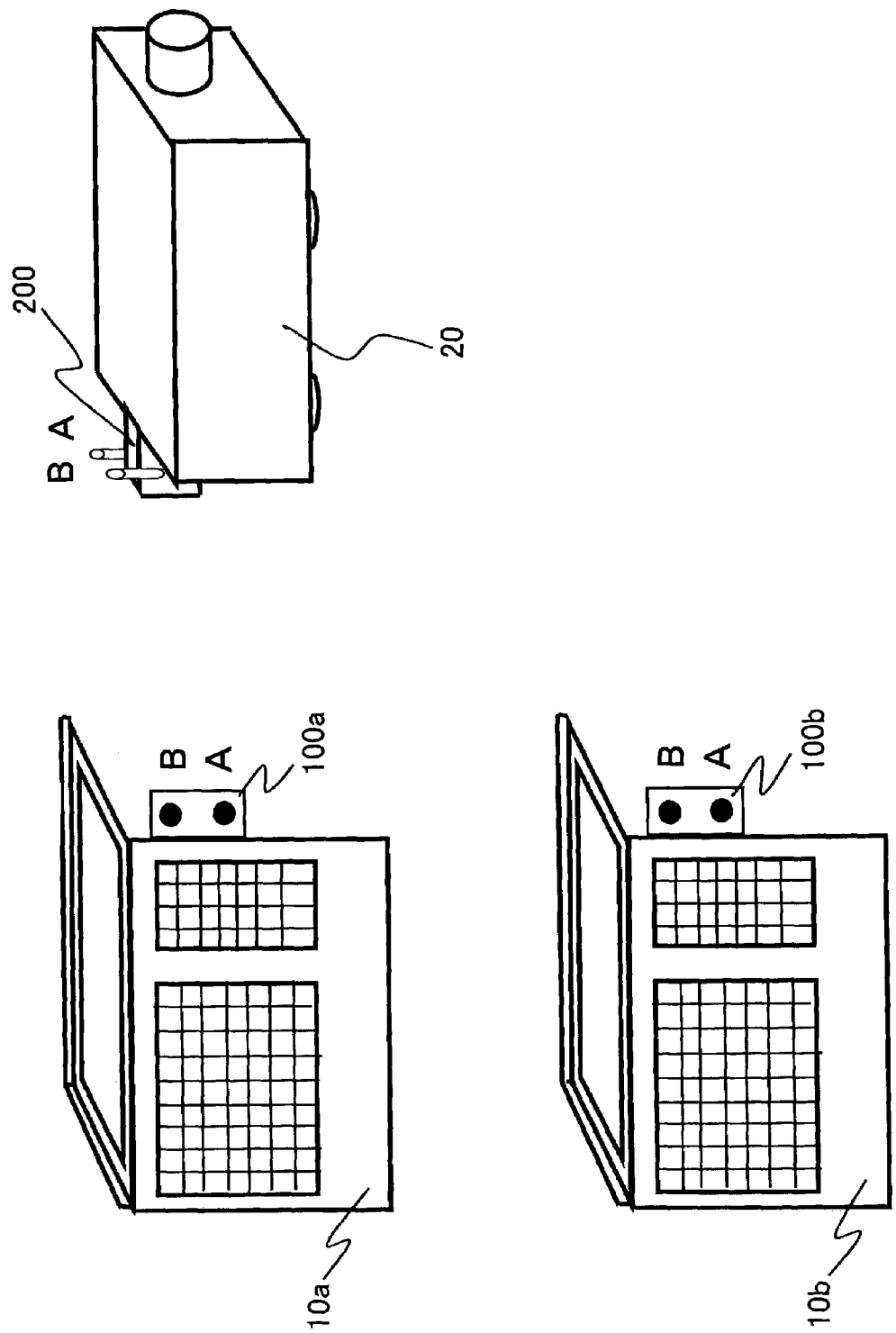
FIG. 15 is a diagram showing multiple first communication equipments.

FIG. 15 shows case the in which multiple first Communication Equipments 100 are used. While a LCD Projector 20 is in use for the case of a big meeting, the multiple Computer 10a and 10b can send the data. Data transfer should be followed in a certain manner and a specific order. The sequence of data transfer by the computers having the identification is expressed hereinafter. There is the existence of two first communication Equipments, the first Communication Equipment A 100a and the first Communication Equipment B 100b. The Computers 10a and 10b are equipped with the first Communication Equipments 100a and 100b, respectively. The LCD projector 20 equips the second Communication Equipment 200.

Figure 16:
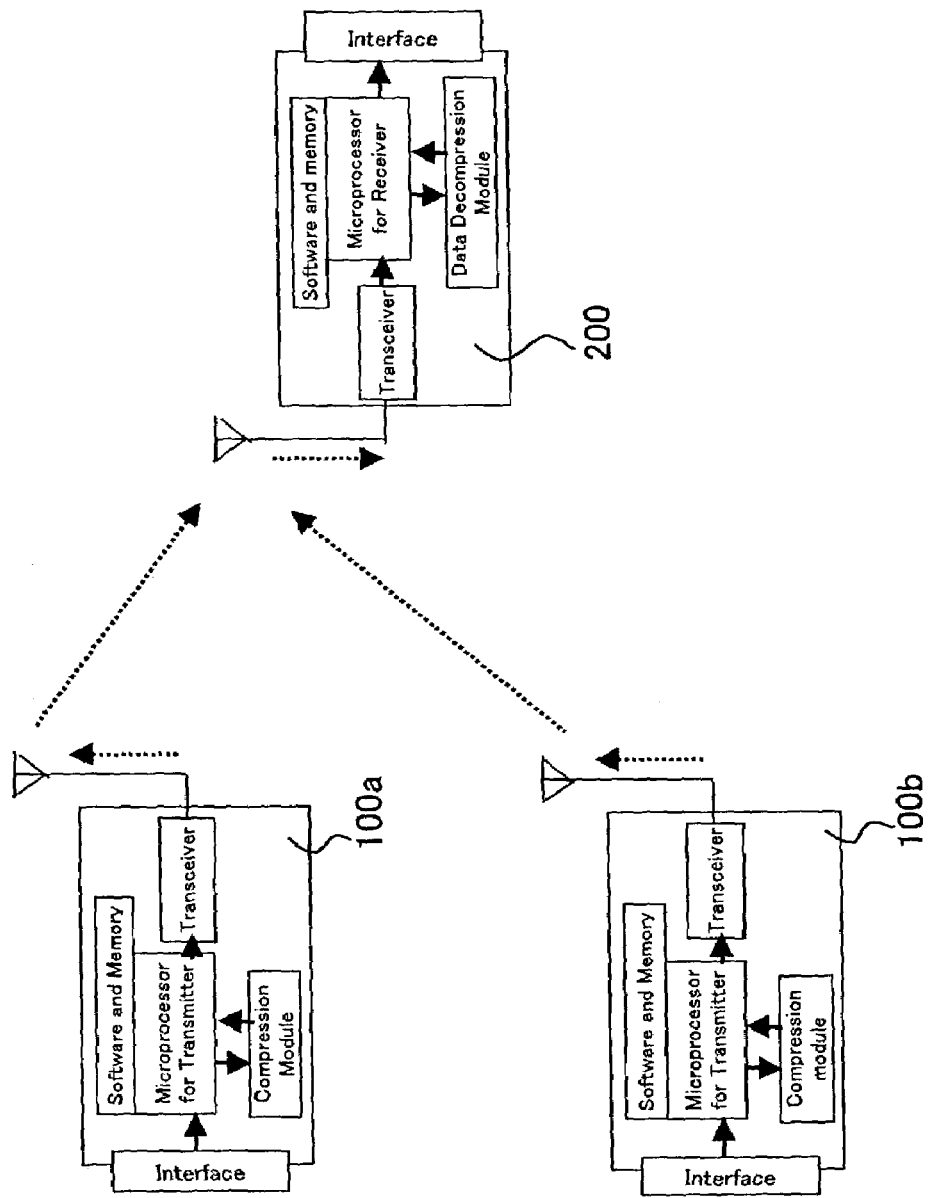
FIG. 16 is a communication block diagram for multiple first communication equipments.

FIG. 16 shows the block diagrams of the case in which multiple first Communication Equipments are used. The difference of this mode form the Mode 1 of the Invention is in exchange of the identification signal.

Figure 17:
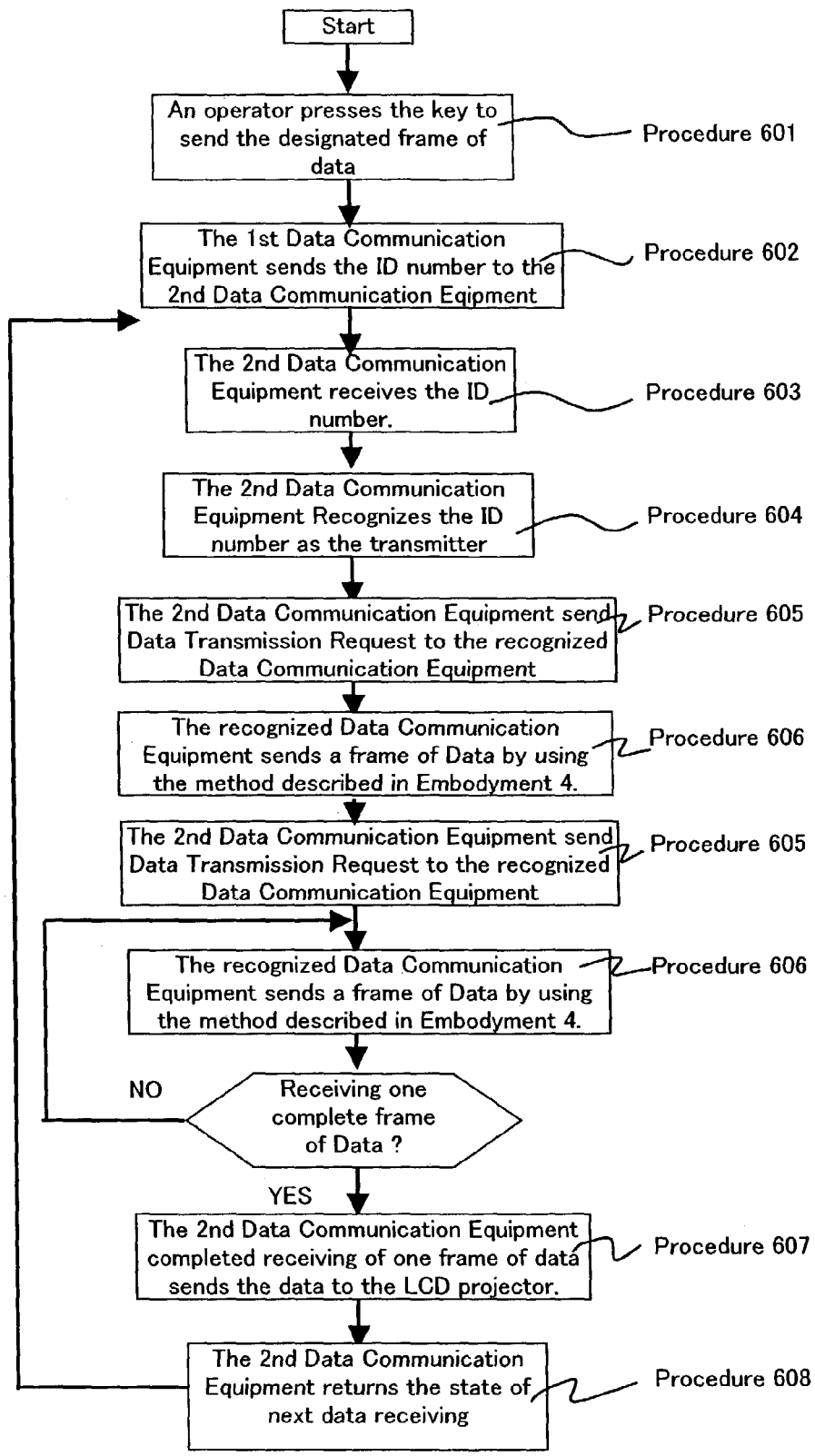
FIG. 17 is a flow chart indicating the procedures of data communication with multiple first communication equipments.

FIG. 17 shows the flow chart where multiple first Communication Equipments are in use. Pressing a frame display key on the computer by an operator defines the display data to be sent from the computer to the LCD Projector (Procedure 601). Pressing a frame display key of the computer 10a lets the first Communication Equipment 100a send the identification number of the first Communication Equipment 100a to the second Communication Equipment 200 (Procedure 602). The second Communication Equipment 200 receives the identification number (Procedure 603). And then the second Communication Equipment 200 then recognizes the first Communication Equipment 10a (Procedure 604) and the data request signal is set to the recognized first Communication Equipment 100a (Procedure 605). The recognized first Communication Equipment 100a sends one frame of data stored in the memory (Procedure 6060). After reception of one frame of data is completed, the second Communication Equipment 200 transfers the data to the LCD Projector 20 and then the second Communication Equipment returns to the state to be ready to accept the next identification number. The multiple computers may inquire for the data transmission on the same frequency at the same time so that the interference caused by the other signal or the transmission of the identification number different from the computer the second Communication Equipment 200 is recognized.

FIG. 18 shows the communication-timing chart for multiple first Communication Equipments. The first Communication Equipment A 100a sends the reception request signal and the identification number and the second Communication Equipment 200 receives those signals. The second Communication Equipment 200 then sends the transmission request signal and the recognized identification number to the first Communication Equipment A 100a. The first Communication Equipment A 100a sends the data 'ABCD' and the second Communication Equipment 200 receives this data. If the second Communication Equipment 200 could copy well, the second Communication Equipment 200 sends an accepting signal as Okay. The first Communication Equipment A 100a recognizes the accepting signal and then the first Communication Equipment A 100a sends the next data set 'EFGH." If the Communication Equipment B 100b sends the reception request signal and the identification number at the moment the first Communication Equipment A 100a sends the data set 'EFGH', the second Communication 200 may not receive the data 'EFGH' correctly and the second Communication Equipment 200 sends the signal of resending in order to send the same set of data. The first Communication Equipment A 100a resends the data 'EFGH' and it continues sending the data set 'EFGH' until the reception of the accepting signal. The same process is followed for the data set 'IJKL'.

Despite that the LCD projector is a suitable mean to display the photography, tables, graphs and other data, there is a case of limited layout of the projector and/or its communication line is linked with the intranet system because of displaying on the screen. Using the product of this invention permits the user of the projector coming from outer world to utilize the projector without changing a cable as long as once the working condition is set. Even if the projector is linked with the intranet network, there is no necessity to change parameters of the computer or no change in the parameters in the network server of the intranet network if the product of this invention takes its place.

The subject to solve here is to replace the hard wired cable to the virtual wire between the data providing units such as a computer and the data display unit such as a LCD projector. The virtual wire here means the radio network that has the features of hard wire cable and it has the characteristics compared with the hard-wired cable.

Firstly the characteristics of hard wire cable are as follows: The cable transfers the data in adequate speed and the data is recovered completely. The cable does not require the power to operate because cable is a passive unit. The cable has the unique transferring characteristic from the sender to the receiver but not to the equipment that is not connected to the cable. The cable is located exterior of the equipments and basically no selectivity other than the type of the connector.

Fitting these characteristics to the radio link, the communication equipment requires data compression system in order to make its size small and sends it by the adequate speed. In order to make sure to recover the data the data correction method should be employed. The equipment has to be very low consumption of power in order not ask outer power source but to supply of power for the interface. The antenna has to be a directional antenna in order to send the data to the specific direction and propagation to the unwanted direction should be minimized. The radio wave has a public characteristic so that preventing the propagation of radio wave to the unwanted direction is important to minimize the leak of confidential information. The interface adapting an outer link and different kinds of apparatus requires the well-defined specification and the capability of Plug-in-play.

Creating radio equipment fulfills the functions such as above mentioned, and the special freedom and directional liberty as the characteristics of radio for the data transmitter and the data receiver are the important factors. This invention permits to create such a kind of communication equipment. The type of radio link to transfer the data of pictures and voice exists commonly for a long time. Unlike the current method the radio transmission with power control prevents unexpected propagation of radio wave in distance. In other word recovering the data becomes difficult and then prevention of the confidential information from leakage becomes possible. The picture is very large in size and the employment of the data compression technique makes possible the high-speed data transfer. The carrier wavelength of the radio link is as small as from several ten centimeters to several centimeters and the radio wave emitted from the antenna may reflect by the ground or a building and the reflected wave shows its phase inverted to that of the direct wave. The direct and reflected waves interfere each other in short distance and the electrical field strength varies in distance. The space diversity antenna helps to increase receiving sensitivity at the reception point.

What is claimed is:

1. A data communication system for performing bi-directional communication between a first communication equipment and a second communication equipment, the data communication system comprising: a first transmitter forming part of the first communication equipment for transmitting a first signal to the second communication equipment; a first receiver forming part of the first communication equipment for receiving a second signal from the second communication equipment indicating whether or not the second communication equipment received the first signal or indicating a condition in which the second communicating equipment received the first signal; a first controller forming part of the first communication equipment for controlling the first transmitter to reduce its transmitting power either until the second signal received by the first receiver indicates that the condition of the reception of the first signal received by the second communication equipment is poor or until the first receiver does not receive any signal from the second communication equipment; a second receiver forming part of the second communication equipment for receiving the first signal transmitted by the first transmitter; a second controller forming part of the second communication equipment for generating the second signal in accordance with the first signal received by the second receiver; and a second transmitter forming part of the second communication equipment for transmitting the second signal to the first receiver; wherein the first communication equipment has a first directional antenna, the first controller electrically adjusting a transmitting direction of the first directional antenna in accordance with a maximum receiving signal strength of the first receiver by changing a phase of the first directional antenna at a reception point thereof; and wherein the second communication equipment has a second directional antenna, the second controller electrically adjusting a transmitting direction of the second directional antenna in accordance with a maximum receiving signal strength of the second receiver by changing a phase of the second directional antenna at a reception point thereof.

2. A data communication system equipment according to claim 1; wherein the second controller controls the second communication equipment to increase the reception capacity of the second receiver only when the second signal indicates that the reception condition of the first signal received by the second receiver is poor.

3. A data communication system according to claim 1; wherein the first communication equipment has a data compressing unit for compressing data corresponding to the first signal transmitted from the first transmitter and received by the second receiver; and wherein the second communication equipment has a data decompression unit for decompressing the compressed data.

4. A data communication system according to claim 1; wherein the first transmitter, the first receiver, the second transmitter, and the second receiver communicate at the same frequency.

5. A data communication system according to claim 1; wherein the second communication equipment has a storing unit for storing data corresponding to the first signal transmitted from the first transmitter; and
wherein the second communication equipment only receives signals from the first communication equipment while the first and second communication equipments are in communication with each other or while the second communication equipment is storing the data corresponding to the first signal transmitted from the first transmitter.

6. A data communication system according to claim 1; further comprising a repeater system for receiving the first signal transmitted from the first transmitter at a first preselected frequency, transmitting the first signal toward the second receiver, at the first preselected frequency, receiving the second signal transmitted from the second transmitter at a second preselected frequency, and transmitting the second signal toward the first receiver at the second preselected frequency.

7. A data communication system according to claim 1; wherein the first signal comprises an image signal.

8. A data communication system comprising:
a first transceiver for transmitting a first signal, the first transceiver having a first directional antenna and a first controller for electrically switching a transmitting direction of the first directional antenna by chancing a phase of the first directional antenna at a reception point thereof;
a second transceiver for transmitting a second signal to the first transceiver and for receiving the first signal from the first transceiver indicative of whether or not the first transceiver received the second signal or of a condition in which the first transceiver received the second signal, the second transceiver having a second directional antenna and a second controller for electrically switching a transmitting direction of the second directional antenna by changing a phase of the second directional antenna at a reception point thereof;
a first control unit for generating the first signal in accordance with the second signal transmitted from the second transceiver; and
a second control unit for controlling the second transceiver to retransmit the second signal to the first transceiver if the first signal received by the second transceiver indicates that the first transceiver did not receive the second signal or that the condition of the reception of the second signal received by the first transceiver is poor.

9. A data communication system according to claim 8; further comprising a first modular communication equipment containing the first transceiver and the first control unit; a second modular communication equipment containing the second transceiver and the second control unit; a processing device connected to the second modular communication equipment for generating image data corresponding to the second signal; and a projecting device connected to the first modular communication equipment for projecting an image corresponding to the image data generated by the processing device.

10. A data communication system according to claim 9; further comprising a first pair of interface terminals each connected to a corresponding one of the projecting device and the first modular communication equipment for connection to one another to communicate the first modular communication equipment to the projecting device; and a second pair of interface terminals each connected to a corresponding one of the processing device and the second modular communication equipment for connection to one another to communicate the second modular communication equipment to the processing device.

11. A data communication system according to claim 9; wherein the first modular communication equipment has a data compressing unit for compressing the image data generated by the processing device;
and wherein the second modular communication equipment has a data decompressing unit for decompressing the image data generated by the processing device.

12. A data communication system according to claim 8; wherein the first transceiver and the second transceiver communicate at the same frequency.

13. A data communication system according to claim 8; further comprising a repeater system for receiving the second signal from the second transceiver at a first preselected frequency, transmitting the second signal to the first transceiver at the first preselected frequency, receiving the first signal transmitted from the first transceiver at a second preselected frequency, and transmitting the second signal to the second transceiver at the second preselected frequency.

14. A data communication system according to claim 8; wherein the first signal comprises an image signal.

* * * * *